(12) United States Patent
Yamaguchi

(10) Patent No.: US 11,506,484 B2
(45) Date of Patent: Nov. 22, 2022

(54) PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

(71) Applicant: NIKON CORPORATION, Tokyo (JP)

(72) Inventor: Masaya Yamaguchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/863,442

(22) Filed: Jan. 5, 2018

(65) Prior Publication Data

US 2018/0128601 A1 May 10, 2018

Related U.S. Application Data

(63) Continuation of application No. 13/688,873, filed on Nov. 29, 2012, now Pat. No. 9,897,437.

(Continued)

(30) Foreign Application Priority Data

Nov. 30, 2011 (JP) .................................. 2011-262838

(51) Int. Cl.
*G01B 11/00* (2006.01)
*G01B 11/24* (2006.01)
(Continued)

(52) U.S. Cl.
CPC ...... *G01B 11/2416* (2013.01); *B23Q 17/2471* (2013.01); *H04N 7/18* (2013.01);
(Continued)

(58) Field of Classification Search
CPC .... G01N 21/84; G01B 11/24; B23Q 17/2471; H04N 7/18; Y10T 29/49769; Y10T 29/54
See application file for complete search history.

(56) References Cited

U.S. PATENT DOCUMENTS 4,644,394 A 2/1987 Reeves
7,259,871 B2 * 8/2007 Chen ..................... G16H 20/40
356/603

(Continued)

FOREIGN PATENT DOCUMENTS

DE 19951852 5/1993
DE 41 42 676 A1 7/1993
(Continued)

OTHER PUBLICATIONS

International Search Report from the European Patent Office for International Application No. PCT/JP2012/081722, dated Mar. 20, 2012.

(Continued)

*Primary Examiner* — Rebecca C Bryant
(74) *Attorney, Agent, or Firm* — Finnegan, Henderson, Farabow, Garrett & Dunner, L.L.P.

(57) ABSTRACT

There is provided a profile measuring apparatus, including: an irradiation section configured to irradiate a measurement light to a measurement area of the object; an imaging section configured to obtain an image of the measurement area; a table configured to place the object thereon; a coordinate calculation section configured to calculate a position of the measurement area based on an image detected by a detection section; and a positioning mechanism configured to drive and control a relative position of the imaging section and the table. The positioning mechanism calculates a relative position of the imaging section to the table, based on an information with respect to an edge line direction of a convex portion or an extending direction of a concave (Continued)

portion in the measurement area of the object having a repetitive concave-convex shape, to move at least one of the table and the imaging section.

43 Claims, 13 Drawing Sheets

Related U.S. Application Data

(60) Provisional application No. 61/616,266, filed on Mar. 27, 2012.

(51) Int. Cl.
*H04N 7/18* (2006.01)
*B23Q 17/24* (2006.01)

(52) U.S. Cl.
CPC ..... *G01B 11/2425* (2013.01); *Y10T 29/49769* (2015.01); *Y10T 29/54* (2015.01)

(56) References Cited

U.S. PATENT DOCUMENTS

| | | | | |
|---|---|---|---|---|
| 7,920,278 | B2* | 4/2011 | Nygaard | G01B 11/028 356/638 |
| 8,462,208 | B2* | 6/2013 | Miralles | G01B 11/25 348/136 |
| 10,094,785 | B2* | 10/2018 | Offenborn | B07C 5/342 |
| 2012/0194651 | A1 | 8/2012 | Kanto et al. | |

FOREIGN PATENT DOCUMENTS

| | | |
|---|---|---|
| DE | 197 18 494 A1 | 11/1998 |
| EP | 2055403 | 5/2009 |
| JP | 54-150163 * | 5/1978 ............ G01B 11/30 |
| JP | H05-322527 | 12/1993 |
| JP | 8-25092 | 3/1996 |
| JP | 2000-230812 | 8/2000 |
| JP | 2010-216939 | 9/2010 |
| JP | 2011-133405 | 7/2011 |
| WO | WO 01/01072 A1 | 1/2001 |

OTHER PUBLICATIONS

Written Opinion of the International Searching Authority for International Application No. PCT/JP2012/081722, dated Nov. 30, 2012.
Goch, English-language translation of Foreign Patent Document No. DE 197 18 494 A1, published Nov. 15, 1998.
Notice of Reasons for Refusal of Japanese Application No. 2014-526020 mailed from the Japan Patent Office dated Aug. 11, 2015.
Notice of Reasons for Refusal of Japanese Application No. 2014-526020 mailed from the Japan Patent Office dated May 26, 2015.
First Official Letter issued in counterpart Chinese Application No. 201280059323.7, dated Nov. 6, 2015, by the State Intellectual Property Office of P.R. China (28 pages).
CAD/CAM Pro/E 5.0. English-language translation of pp. 163-166, 10 pages (Oct. 2010).
Requirement for Restriction/Election dated Oct. 21, 2014 in the parent U.S. Appl. No. 13/688,873.
Office Action dated Aug. 13, 2015 in the parent U.S. Appl. No. 13/688,873.
Office Action dated Mar. 18, 2016 in the parent U.S. Appl. No. 13/688,873.
Advisory Action dated Sep. 16, 2016 in the parent U.S. Appl. No. 13/688,873.
Office Action dated Feb. 23, 2017 in the parent U.S. Appl. No. 13/688,873.
Article 94(3) EPC Communication in counterpart European Patent Application No. 12816143.7, dated May 10, 2019.

* cited by examiner

Fig. 4A
Fig. 4B
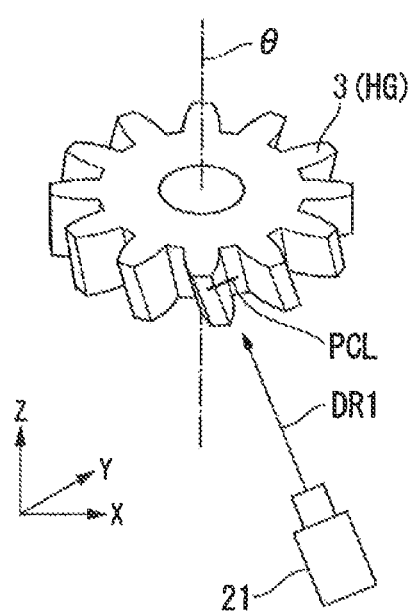
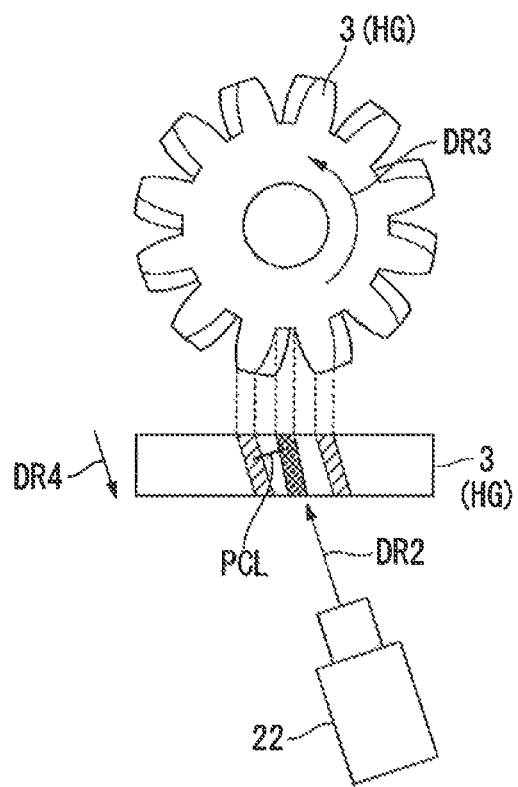

Fig. 6A
Fig. 6B
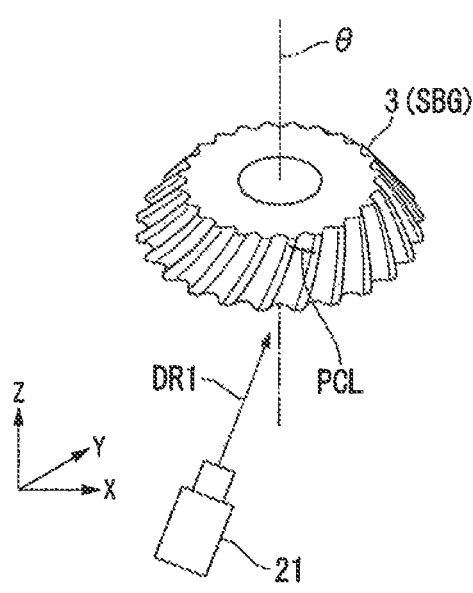
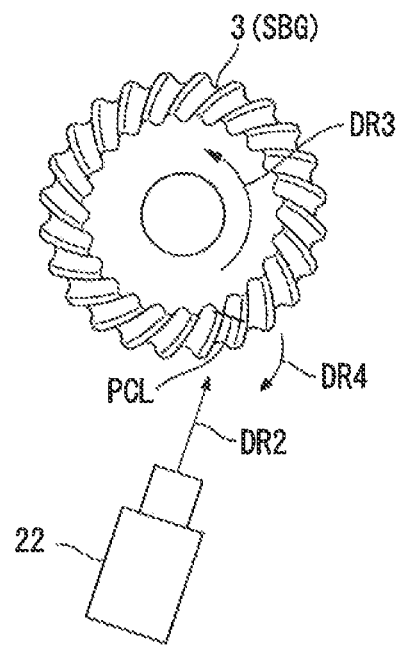

PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

CROSS-REFERENCE TO RELATED APPLICATIONS

The present application is a continuation of U.S. patent application Ser. No. 13/688,873, filed Nov. 29, 2012, which claims priority from U.S. Provisional Patent Application No. 61/616,266 filed on Mar. 27, 2012 and claims priority from Japanese Patent Application No. 2011-262838 filed on Nov. 30, 2011, all the disclosures of which are incorporated herein by reference in their entirety.

BACKGROUND

Field of the Invention

The present invention relates to a profile measuring apparatus, a method for measuring a profile, a structure manufacturing system, a method for manufacturing a structure and non-transitory computer readable medium storing a program thereof.

Description of the Related Art

There has been conventionally known a profile measuring apparatus which measures the profile of the surface of an object to be measured having a complicated profile, such as a gear and a turbine, by a contact sensor. Such a profile measuring apparatus measures the profile of the surface of the object by converting the position of the contact sensor in a state of being brought in contact with the surface of the object to space coordinates of the surface of the object (see, for example, Japanese Patent Publication No. 08-025092).

SUMMARY

According to an aspect of the present teaching, there is provided a profile measuring apparatus which measures a profile of an object, including:
an irradiation section configured to irradiate a measurement light to a measurement area of the object;
an imaging section optically connected to the irradiation section and configured to obtain an image of the measurement area including a position to which the measurement light is irradiated by the irradiation section;
a table configured to place the object thereon;
a coordinate calculation section communicatably connected to the imaging section and configured to calculate a position of the measurement area based on an image detected by a detection section; and
a positioning mechanism configured to drive and control a relative position of the imaging section and the table relative to each other,
wherein the positioning mechanism calculates the relative position of the imaging section to the table, based on an information with respect to an edge line direction of a convex portion or an extending direction of a concave portion in the measurement area of the object having a repetitive concave-convex shape, to move at least one of the table and the imaging section relative to each other.

BRIEF DESCRIPTION OF THE DRAWINGS

FIGS. 4A and 4B are configuration diagrams each showing a direction in which a profile of an object to be measured (helical gear) is measured according to the first embodiment.

FIGS. 6A and 6B are configuration diagrams each showing a direction in which a profile of an object to be measured (spiral bevel gear) is measured according to the first embodiment.

DESCRIPTION OF THE EMBODIMENTS

First Embodiment

Figure 1:
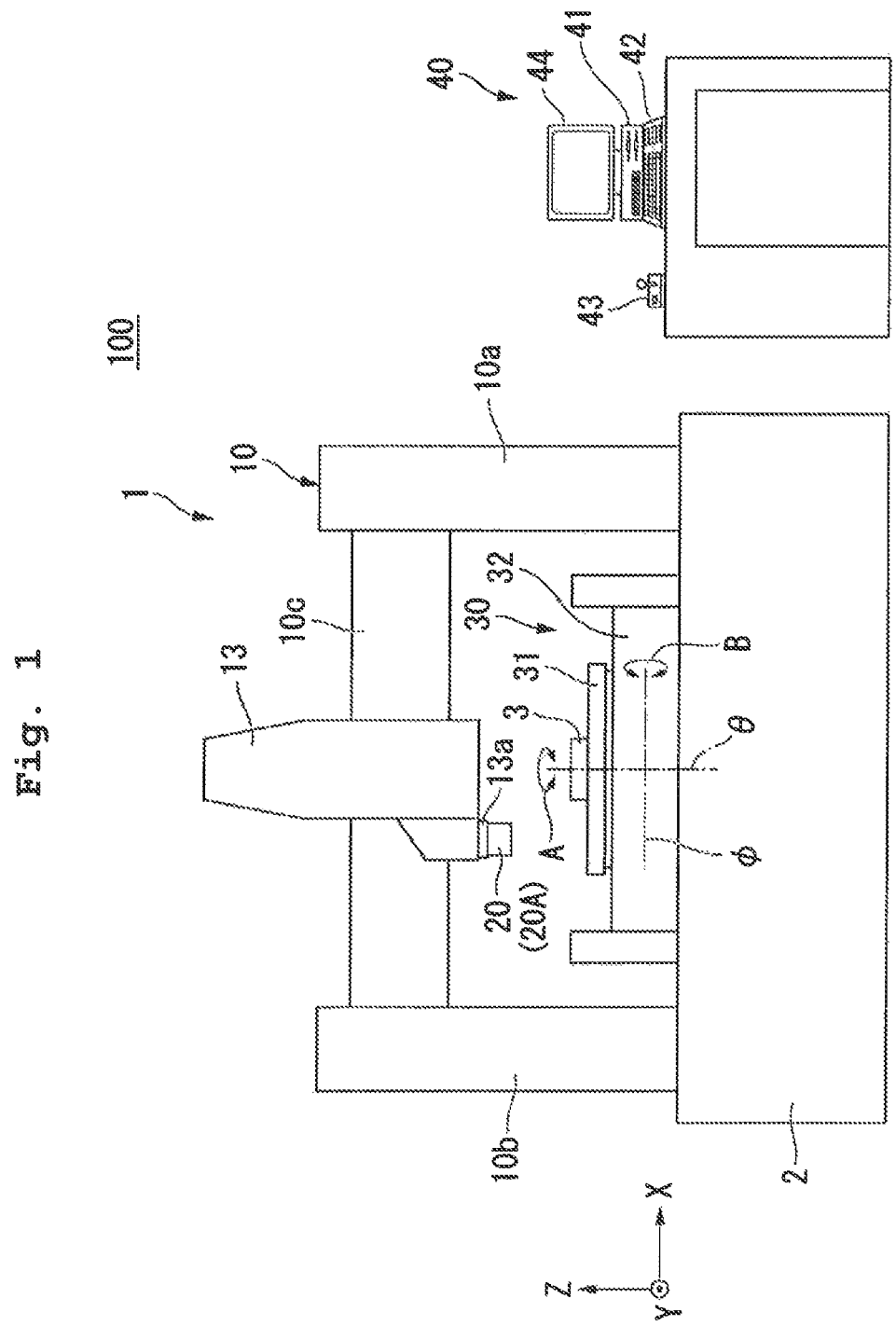
FIG. 1 is a diagram showing a configuration of a profile measuring apparatus according to the first embodiment of the present teaching.
Figure 2:
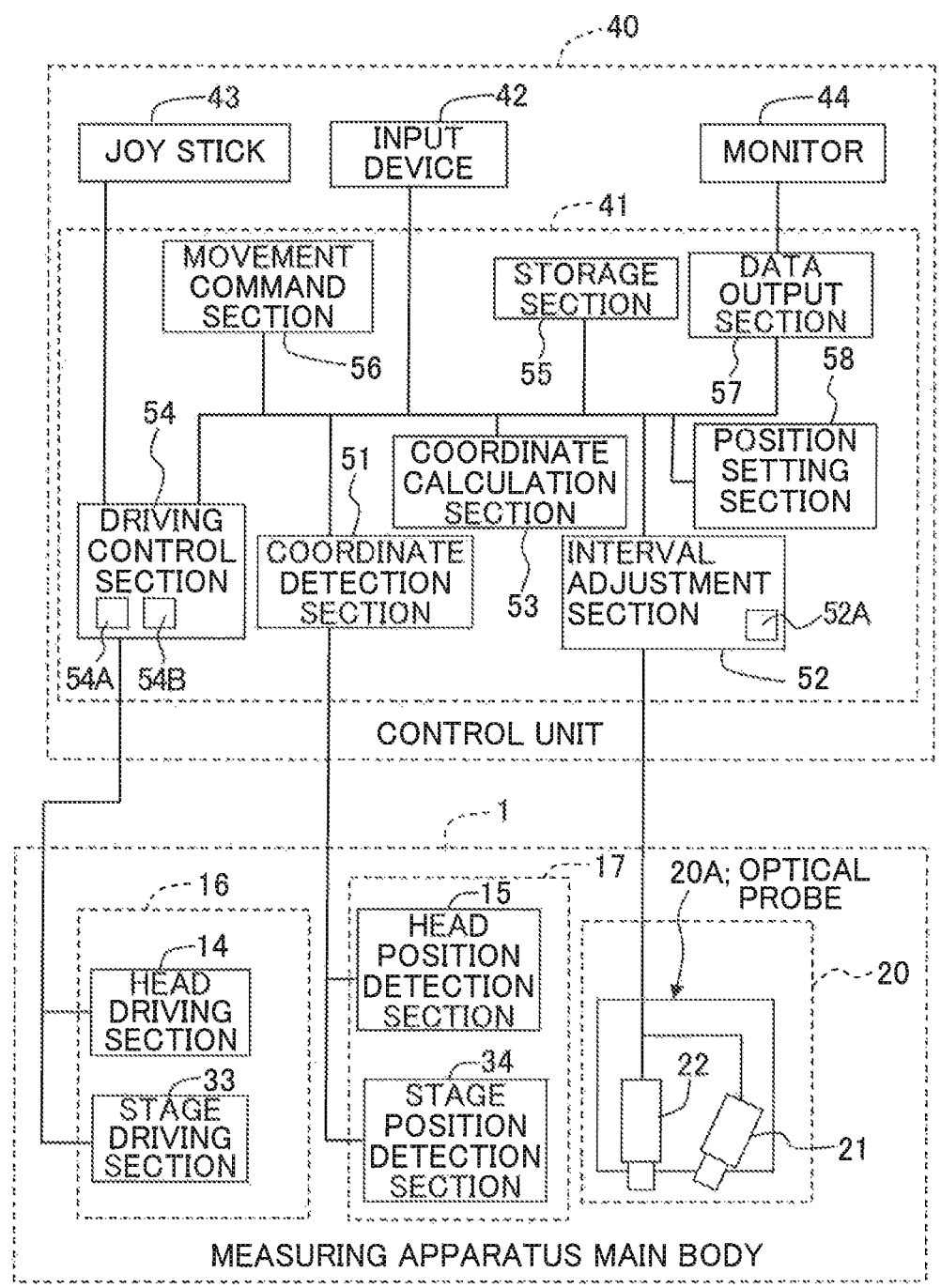
FIG. 2 is a block diagram showing the configuration of the profile measuring apparatus of the first embodiment.

Hereinbelow, an explanation will be made about embodiments of the present teaching with reference to drawings. FIG. 1 schematically shows a configuration of a profile measuring apparatus 100 according to an embodiment of the present teaching. The profile measuring apparatus 100 includes a measuring apparatus main body 1 and a control unit 40 (see FIG. 2). FIG. 2 shows a block diagram of the measuring apparatus main body 1 and the control unit 40 according the embodiment of the present teaching.

As shown in FIG. 1, the measuring apparatus main body 1 includes a base 2 having a horizontal upper surface (reference plane), a movement section 10 which is provided on the base 2 and supports and moves a measurement head 13, and a support device 30 which is provided on the base 2 and on which an object to be measured 3 (hereinafter referred to simply as "object 3") is placed. The profile measuring apparatus 100 of this embodiment measures the profile of the surface of the object 3, such as a gear and a turbine, having a concave-convex shape which is periodically aligned in a circumferential direction and extends in a direction different from the circumferential direction. In particular, the gear, the turbine, and the like each have the profile as follows. That is, in the profile which is projected from a vertical direction onto a plane parallel to the circumferential direction, edge lines of convex portions and valley lines of concave portions extend radially with respect to the center, at the circumferential portion of the profile. Therefore, an example of an extending direction of the concave-convex shape is exemplified by the edge lines of the convex portions and the valley lines of the concave portions. Here, a rectangular coordinate system which is based on the reference plane of the base 2 is defined. An X-axis and a Y-axis orthogonal with each other are defined to be parallel to the reference plane; and a Z-axis is defined in a direction perpendicular to the reference plane. Further, a guide rail (not shown) extending in the Y direction (which is a direction perpendicular to the sheet surface of FIG. 1, this direction is supposed to be a front-rear direction) is provided in the base 2.

The movement section 10 (a second movement section) is movably provided on the guiderail in the Y direction and includes a brace member (strut) 10a and a horizontal frame 10c, which is wound to extend horizontally between the brace member 10a and a brace member (strut) 10b for pairing with the brace member 10a, to form a gate-shaped structure. Further, the movement section 10 includes a carriage (not shown) which is movable in the horizontal frame 10c in the X direction (left-right direction) and the measurement head 13 which is movable in the Z direction (up-down direction) with respect to the carriage.

A detection section 20 (holding section) which detects the profile of the object 3 is provided on a lower portion of the measurement head 13. The detection section 20 is supported by the measurement head 13 to detect a distance from the object 3 disposed below the detection section 20. By controlling the position of the measurement head 13, it is possible to move the position of the detection section 20. Further, a head rotation mechanism 13a which rotates the detection section 20 around an axis parallel to the Z-axis direction is provided between the detection section 20 and the carriage.

In the movement section 10, there are provided a head driving section 14 (see FIG. 2) which electrically moves the measurement head 13 in three directions (X, Y, Z directions) based on a driving signal inputted and a head position detection section 15 (see FIG. 2) which detects coordinates of the measurement head 13 to output the signal indicating coordinate values of the measurement head 13.

The support device 30 is provided on the base 2. The support device 30 includes a stage 31 and a support table 32. The object 3 is placed on and held by the stage 31. The support table 32 rotatably supports the stage 31 around rotational axes in two directions orthogonal with each other so that the stage 31 can be horizontally rotated and can be tilted with respect to the reference plane. The support table 32 of this embodiment supports the stage 31 so that the stage 31 is rotatable in the A-direction as shown in FIG. 1 in the horizontal plane with a rotational axis $\theta$ extending vertically (in the Z direction) as a rotation center and is rotatable in the B-direction as shown in FIG. 1 with a rotational axis $\phi$ extending horizontally (in the X direction) as the rotation center.

There are provided, in the support device 30, a stage driving section 33 (movement section, first movement section) (see FIG. 2) which electrically drives and rotates the stage 31 around the rotational axis $\theta$ and the rotational axis $\phi$ based on the driving signal inputted and a stage position detection section 34 (see FIG. 2) which detects the coordinates of the stage 31 to output the signal indicating stage coordinate values.

The control unit 40 includes a control section 41, an input device 42, and a monitor 44. The control section 41 controls the measuring apparatus main body 1. Details will be described later. The input device 42 is exemplified by a keyboard and the like through which various kinds of instruction information is inputted. The monitor 44 displays a measurement screen, an instruction screen, a measurement result, and the like thereon.

Subsequently, an explanation will be made about the structure of the measuring apparatus main body 1 with reference to FIG. 2. The measuring apparatus main body 1 includes a driving section 16, a position detection section 17, and the detection section 20 (holding section).

The driving section 16 includes the head driving section 14 and the stage driving section 33 (movement section). The head driving section 14 includes a Y-axis motor which drives the brace members 10a, 10b in the Y direction, an X-axis motor which drives the carriage in the X direction, a Z-axis motor which drives the measurement head 13 in the Z direction, and a head rotating motor which rotates the detection section 20 with respect to the axis parallel to the Z-axis direction. The head driving section 14 receives the driving signal supplied from a driving control section 54 as will be described later. The head driving section 14 electrically moves the measurement head 13 in the three directions (X, Y, Z directions) based on the driving signal. The stage driving section 33 (movement section) includes a rotary axis motor which drives and rotates the stage 31 around the rotational axis $\theta$ and a tilt axis motor which drives and rotates the stage 31 around the rotational axis. Further, the stage driving section 33 receives the driving signal supplied from the driving control section 54 to electrically rotate the stage 31 around the rotational axis $\theta$ and the rotational axis $\phi$ based on the driving signal received. The stage driving section 33 relatively moves the position of the object 3 to which a measurement light is irradiated in a movement direction DR3 (third direction) of the detection section 20 (holding section) which is determined corresponding to a circumferential direction. The stage driving section 33 moves the detection section 20 in the movement direction DR3 of the detection section 20 relative to the object 3. The stage driving section 33 moves and rotates the object 3 so that a central axis AX of the object 3 coincides with the rotational axis $\theta$ of rotational movement.

For example, in a case that the profile of the gear as the object 3 is measured, the stage driving section 33 (movement section, first movement section) relatively moves the position of the object 3 to which the measurement light is irradiating the movement direction DR3 (third direction) of the detection section 20 (holding section) which is determined corresponding to a direction of a tooth width of a tooth of the gear.

The position detection section 17 includes the head position detection section 15 and the stage position detection section 34. The head position detection section 15 includes an X-axis encoder, a Y-axis encoder, a Z-axis encoder, and a head rotation encoder which detect positions of the X-axis, the Y-axis, and the Z-axis directions of the measurement head 13 and a setting angle of the head, respectively. The head position detection section 15 detects the coordinates of the measurement head 13 by these encoders to supply the signals indicating the coordinate values of the measurement head 13 to a coordinate detection section 51 as will be described later. The stage position detection section 34 includes a rotary-axis encoder and a tilt-axis encoder which detect rotation positions around the rotational axis $\theta$ and the rotational axis $\phi$ of the stage 31, respectively. The stage position detection section 34 detects the rotation positions around the rotational axis $\theta$ and the rotational axis $\phi$ of the stage 31 by using these encoders to supply the signals indicating the detected rotation positions to the coordinate detection section 51.

The detection section 20 (holding section) includes an optical probe 20A having an irradiation section 21 and an imaging section 22 to detect the profile of the surface of the object 3 by an optical cutting method. That is, the detection section 20 (holding section) holds the irradiation section 21 and the imaging section 22 so that a relative position between the irradiation section 21 and the imaging section 22 is not changed. The irradiation section 21 irradiates the measurement light having a predetermined light amount distribution to a measurement area of the object (surface of the object) in accordance with an irradiation direction DR1 (first direction) which is determined corresponding to a normal direction of the surface of the object 3, based on a control signal which controls irradiation of the light supplied from an interval adjustment section 52 as will be described later on. The measurement light includes, for example, a light amount distribution which is formed in a line form in a case that the measurement light is irradiated to the horizontal plane. In this case, the measurement light irradiated to the object 3 is formed by projecting, onto the object 3, a linear projection pattern in which a longitudinal direction is set depending on the concave-convex shape of the object 3. The head rotation mechanism 13a is driven and controlled so that the longitudinal direction is to be the direction as described above. Such a measurement light can be formed in the line form, for example, by refracting or sweeping the light emitted from a point light source. An optical cutting line PCL is formed on the surface of the object 3 by the measurement light formed in the line form. That is, the optical cutting line PCL is formed depending on the profile of the surface of the object 3.

For example, in a case that the profile of the gear as the object 3 is measured, the irradiation section 21 irradiates the measurement light, which has a light amount distribution depending on the profile of the surface of the tooth of the gear as the object 3, to a tooth plane of the tooth from the irradiation direction DR1 (first direction) which is determined corresponding to a normal direction of the tooth plane. In this case, the optical cutting line PCL is formed depending on the profile of the surface of the object 3 (for example, profile of the tooth plane of the gear).

The imaging section 22 generates an image by taking the image of the measurement light from an imaging direction DR2 (second direction) which is determined corresponding to a predetermined direction of the surface to which the measurement light is irradiated (a direction different from the circumferential direction of the object 3). For example, the imaging section 22 of this embodiment generates the image by taking the image of the measurement light from the extending direction of the concave-convex shape of the object 3 which is supposed to be the imaging direction DR2. Here, in a case that the object 3 is the gear, the extending direction of the concave-convex shape of the object 3 (namely, tooth of the gear) is, for example, a direction of a ridge line of a tooth of the gear. In this case, the imaging section 22 of this embodiment generates, as a taken image, an image of the tooth plane to which the measurement light is projected from the direction of the ridge line of the tooth of the gear as the object 3. As described above, the imaging section 22 takes the image of the optical cutting line PCL formed on the surface of the object 3 by the irradiation light, from the irradiation section 21. Although the imaging direction DR2 is set corresponding to the extending direction of the concave-convex shape of the object 3, the imaging direction DR2 is not necessarily required to coincide with the extending direction of the concave-convex shape. The imaging direction DR2 can be a direction in which the concave portion or the convex portion of a measurement portion is not hidden by each adjacent convex portion as viewed from the imaging section 22.

The imaging section 22 takes the image of a shadow pattern formed on the surface of the object 3 to supply information of the image to the interval adjustment section 52. Accordingly, the control unit 40 obtains profile measurement data. The imaging section 22 includes a solid-state imaging device such as a charge coupled device (CCD) and a complementary metal oxide semiconductor (C-MOS) sensor.

For example, in the case that the profile of the gear as the object 3 is measured, the imaging section 22 generates the image by taking the image of the optical cutting line from the imaging direction DR2 (second direction) which is determined corresponding to the direction of the ridge line of the tooth of the tooth plane to which the measurement light is irradiated.

Subsequently, the control unit 40 will be explained. As described above, the control unit 40 includes the control section 41, the input device 42, and the monitor 44. The input device 42 includes the keyboard through which various kinds of instruction information is inputted by a user. The input device 42 detects, for example, the instruction information inputted in the keyboard; and writes the detected instruction information into a storage section 55 so that the detected instruction information is stored in the storage section 55. For example, the type of the object 3 is inputted as the instruction information in the input device 42 of this embodiment. For example, in a case that the object 3 is the gear, the type of the gear as the type of the object 3 (for example, a spur gear SG, a helical gear HG, a bevel gear BG, a spiral bevel gear SBG, and a worm gear WG) is inputted as the instruction information in the input device 42.

The monitor 44 receives measurement data (coordinate values of all of the measurement points) supplied from a data output section 57 and the like. The monitor 44 displays the received measurement data (coordinate values of all of the measurement points) and the like, thereon. Further, the monitor 44 displays the measurement screen, the instruction screen, and the like thereon.

The control section 41 includes the coordinate detection section 51, the interval adjustment section 52, a coordinate calculation section 53 (measurement section), the driving control section 54, the storage section 55, a movement command section 56, the data output section 57, and a position setting section 58.

In the storage section 55, for each of the types of the objects 3, the position in the extending direction of the concave-convex shape of the object 3 is associated with information, which indicates the extending direction of the concave-convex shape for each position in the extending direction of the concave-convex shape, and the association is stored in advance. In the storage section 55 of this embodiment, for example, for each of the types of the gears, the position in the direction of the ridge line of the tooth of the gear is associated with information, which indicates the direction of the ridge line of the tooth for each position in the direction of the ridge line of the tooth, and the association is stored in advance. That is, the movement direction of the measurement point is associated with the type of the gear and the association is in advance stored in the storage section 55. In the storage section 55, for each of the types of the objects 3, coordinate values of a position for starting the measurement (first measurement point) of the object 3, coordinate values of a position for completing the measurement (last measurement point) of the object 3, and a spacing distance between each measurement point are associated with the type of the object 3 and the association is stored in advance. Point group data of three-dimensional coordinate values supplied from the coordinate calculation section 53 is held in the storage section 55 as the measurement data. Coordinate information of each measurement point supplied from the coordinate detection section 51 is held in the storage section 55. Design data (CAD data) is held in the storage section 55. As described below, the position setting section 58 obtains the direction of the ridge line (of the tooth) of the object 3 from the design data held in the storage section 55, and outputs the obtained data for the direction of the ridge line of the object 3 to the movement command section 56.

The coordinate detection section 51 detects, based on the coordinate signal outputted from the head position detection section 15, the position of the optical probe 20A supported by the head position detection section 15, that is, an observation position in the horizontal direction and an observation position in the up-down direction, and the imaging direction of the optical probe 20A. The coordinate detection section 51 detects, based on the signal indicating the rotation position outputted from the stage position detection position 34, rotation positions around the rotational axis θ and the rotational axis φ of the stage 31. The coordinate detection section 51 detects coordinate information based on information of the observation position in the horizontal direction and information of the observation position in the up-down direction detected respectively, and information indicating the rotation positions outputted from the stage position detection section 34 (rotation position information of the stage 31). The coordinate detection section 51 supplies the coordinate information and the imaging direction of the optical probe 20A and the rotation position information of the stage 31 to the coordinate calculation section 53. The coordinate detection section 51 detects, based on the coordinate information and the imaging direction of the optical probe 20A and the rotation position information of the stage 31, information of a relative movement route between the optical probe 20A and the stage 31, information of a relative movement velocity between the optical probe 20A and the stage 31, and information as to whether or not the movement is stopped, and the like; and supplies the detected information to the movement command section 56.

The interval adjustment section 52 reads data specifying sampling frequency on the storage section 55 before the measurement of coordinates is started. The interval adjustment section 52 receives the image information from the imaging section 22 at the sampling frequency. Then, the interval adjustment section 52 supplies to the coordinate calculation section 53 image information for calculating the profile data of the surface of the object 3 in which one or more frames is/are thinned out from the received image information.

The interval adjustment section 52 includes an imaging-section control section 52A. The imaging-section control section 52A changes an interval of taking images (an imaging interval) of the imaging section 22 depending on the position in a radial direction of the rotational movement of the object 3 to which the illumination light is irradiated. For example, in a case that the position in the radial direction of the rotation direction of the object 3 to which the measurement light is irradiated is close to the outermost circumference, the imaging-section control section 52A makes the imaging interval of the imaging section 22 (that is, a time interval to take the image of the object 3 by the image section 22) shorter than that of a case in which said position is close to the rotational center. As described above, in a case that an exposure time of the imaging section 22 is sufficiently short to an extent that there is no blurring in the taken image, even when the image is taken in the case that the position in the radial direction of the rotational movement of the object 3 to which the measurement light is irradiated is at the outermost circumference, the imaging-section control section 52A changes the imaging interval. Accordingly, the profile measuring apparatus 100 is capable of measuring the profile without changing velocity of the rotational movement of the object 3. The imaging interval is preferably varied based on the length of the measurement light in the longitudinal direction in a case that the measurement light is irradiated to the object 3 (or the length of when the measurement light is projected in the radial direction) and a rotational linear velocity at the measurement position.

The driving control section 54 outputs the driving signal to the head driving section 14 to drive and control the measurement head 13 based on a command signal from the movement command section 56. The driving control section 54 includes a movement control section 54A and a velocity control section 54B. The movement control section 54A relatively rotates the object 3 in the movement direction DR3 (third direction) of the detection section 20 (holding section) which is determined corresponding to the circumferential direction of the object 3 to move the position to which the measurement light is irradiated. The movement control section 54A of this embodiment rotates, for example, the gear as the object 3 in the movement direction DR3 (namely, the circumferential direction of the gear) which is determined to coincide with the circumferential direction of the gear to move the position to which the measurement light is irradiated. That is, the movement control section 54A relatively rotates the gear in the movement direction DR3 (third direction) of the detection section 20 to relatively move the position to which the measurement light is irradiated in the movement direction DR3 of the detection section 20. Accordingly, the profile measuring apparatus 100 of this embodiment successively irradiates the measurement light to each concave-convex shape (for example, each tooth of the gear or each blade of the turbine as the object 3) which is periodically aligned in the circumferential direction of the object 3 and extends in the direction different from the circumferential direction to measure the profile of the surface of the object 3.

The velocity control section 54B controls the movement velocity for relatively rotating the object 3 depending on the position in a stage-radius rs direction (radial direction) of the rotational movement of the object 3 to which the measurement light is irradiated. For example, in a case that the profile of the bevel gear BG as the object 3 is measured, the velocity control section 54B of this embodiment controls rotational movement velocity of the stage 31 to be slower, as the position in the stage-radius rs direction of the bevel gear BG to which the measurement light is irradiated is moved to the outer circumferential portion from the rotational center portion of the bevel gear BG. In other words, the velocity control section 54B controls the rotational movement velocity of the stage 31 as follows. That is, in a case that the position of the bevel gear BG to which the measurement light is irradiated is the inner circumferential portion of the bevel gear BG, the rotational movement velocity is controlled to be high; and in a case that the position of the bevel gear BG to which the measurement light is irradiated is the outer circumferential portion of the bevel gear BG, the rotational movement velocity is controlled to be low.

The coordinate calculation section 53 (measurement section) calculates the profile data of the surface of the object 3, namely three-dimensional profile data, based on the profile of the surface of the object 3 detected by the optical probe 20A. In other words, the coordinate calculation section 53 (measurement section) measures the profile of the surface from the image taken by the imaging section 22, based on the position at which the measurement light is detected on the imaging plane of the imaging section 22. The coordinate calculation section 53 receives the image information which is supplied from the interval adjustment section 52 and in which the frame is thinned out. The coordinate calculation section 53 receives the coordinate information and the imaging direction of the optical probe 20A and the rotation position information of the stage 31 those of which are supplied from the coordinate detection section 51. The coordinate calculation section 53 calculates the point group data of the coordinate values (three-dimensional coordinate values) of each of the measurement points based on the image information supplied from the interval adjustment section 52, the coordinate information and the imaging direction of the optical probe 20A, and the rotation position information of the stage 31.

For example, in the case that the profile of the gear as the object 3 is measured, the coordinate calculation section 53 (measurement section) measures the profile of the tooth based on the position of the measurement light in the image taken by the imaging section 22.

The calculation method will be specifically explained below. At first, the coordinate calculation section 53 calculates, based on the coordinates of the optical probe 20A received, the coordinates of the irradiation section 21 fixed to the optical probe 20A and the coordinates of the imaging section 22 fixed to the optical probe 20A. Here, since the irradiation section 21 is fixed to the optical probe 20A, the irradiation angle of the irradiation section 21 is fixed to the optical probe 20A. Further, since the imaging section 22 is also fixed to the optical probe 20A, the imaging angle of the imaging section 22 is fixed to the optical probe 20A.

The coordinate calculation section 53 calculates the coordinates of the point at which the light is irradiated to the object 3 by using triangulation for each pixel of the image taken by the imaging section 22. The coordinate of the point at which the light is irradiated to the object 3 is the coordinate of an intersection point between a straight line extending from the coordinate of the irradiation section 21 in a direction of the irradiation angle of the irradiation section 21 and a straight line (optical axis) extending from the coordinate of the imaging section 22 in a direction of the imaging angle of the imaging section 22. The image taken by the imaging section 22 indicates the image detected by the optical probe 20A which is arranged at the measurement position. Accordingly, the coordinate calculation section 53 (measurement section) measures the profile of the surface based on the position of the measurement light in the image taken by the imaging section 22.

The object 3 is supported by the stage 31. By rotating the stage 31 around the rotational axis θ by the support table 32, the object 3 rotates, together with the stage 31, with the rotational axis θ of the stage 31 as the rotational center. Further, by rotating the stage 31 around the rotational axis φ, the object 3 rotates, together with the stage 31, with the rotational axis θ of the stage 31 as the rotational center. In other words, the coordinates of the position to which the calculated light is irradiated correspond to information indicating the position of the surface of the object 3, the posture of which is inclined by rotating the stage 31 around the rotational axis θ and the rotational axis φ. Accordingly, the coordinate calculation section 53 calculates the coordinates of the position to which the light is irradiated by correcting the incline of the stage 31, namely based on the rotation position information around the rotational axis θ and the rotational axis φ, and thereby the coordinate calculation section 53 calculates profile data of the surface of the actual object 3. Further, the coordinate calculation section 53 makes the storage section 55 store the point group data of the three-dimensional coordinate values, which is the profile data of the surface of the object 3 calculated, therein.

The driving control section 54 outputs the driving signal to the head driving section 14 and the stage driving section 33 (movement section) based on the command signal from the movement command section 56 to drive and control the measurement head 13 and the stage 31.

The movement command section 56 reads, from the storage section 55, the instruction information (namely, the type of the object 3) stored by the input device 42. The movement command section 56 reads, from the storage section 55, data and the like indicating coordinate values of the measurement point which indicate a measurement range of the object 3 associated with the type of the object 3 read from the storage section 55, coordinate values of the position for starting the measurement (first measurement point) of the object 3, coordinate values of the position for completing the measurement (last measurement point) of the object 3, the movement direction of the measurement point, and the spacing distance between each measurement point (for example, a measurement pitch of a constant distance). The movement command section 56 send, to the position setting section 58, the data regarding the form or shape of the object 3 among the above data read from the storage section 55. The position setting section 58 obtains the direction of the ridge line (of the tooth) of the object 3 from the data regarding the shape or form of the object 3, and outputs the obtained data for the direction of the ridge line of the object 3 to the movement command section 56. The movement command section 56 calculates the movement route of scan with respect to the object 3 based on the read data from the storage section 55 and the obtained data for the direction of the ridge line of the object 3. Then, the movement command section 56 supplies the command signal for driving the measurement head 13 and the stage 31 to the driving control section 54 in accordance with the calculated movement route and the spacing distance of each measurement point (for example, the measurement pitch of the constant distance) and the like read from the storage section 55; and drives the measurement head 13 and the stage 31 by the head driving section 14 and the stage driving section 33 (movement section).

For example, the movement command section 56 supplies command signals commanding drive or stop of the movement of the object 3 and drive or stop of the rotation of the stage 31 in accordance with the movement route and the measurement pitch, and thereby the relative position between the optical probe 20A and the stage 31 is moved and stopped for each measurement point. The movement command section 56 supplies the command signal to the interval adjustment section 52.

The data output section 57 reads the measurement data (coordinate values of all of the measurement points) and the like from the storage section 55. The data output section 57 supplies the measurement data and the like to the monitor 44. The data output section 57 outputs the measurement data and the like to a design system (not shown) such as a printer and/or a CAD system.

For example, the interval adjustment section 52 receives the image information in which it is taken the image of the shadow pattern formed by the measurement light which is irradiated on the surface of the object 3 by the optical probe 20A at the predetermined sampling frequency. Based on the image information, the coordinate calculation section 53 calculates the coordinates of the point at which the light is irradiated to the object 3 (point on the shadow pattern) by using the triangulation for each pixel of the taken image. The coordinate calculation section 53 calculates the point group data of the coordinate values of the shadow pattern for every information of the image taken at the predetermined sampling frequency.

Next, an explanation will be made about a case in which the profile measuring apparatus 100 of this embodiment measures the profile of the gear as the object 3. In particular, the explanation will be made by citing a case in which the profile of each of the spur gear SG, the helical gear HG, the bevel gear BG, the spiral bevel gear SBG, and the worm gear WG is measured for each of the directions including the irradiation direction DR1, the imaging direction DR2, the movement direction DR3, and the movement direction DR4.

<Measurement of Spur Gear>

Figure 3A:
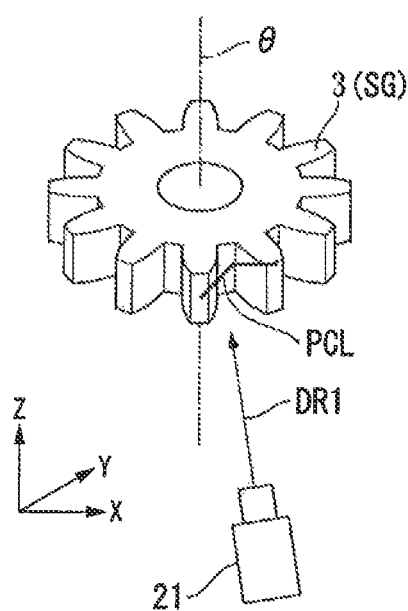
FIGS. 3A and 3B are configuration diagrams each showing a direction in which a profile of an object to be measured (spur gear) is measured according to the first embodiment.
Figure 3B:
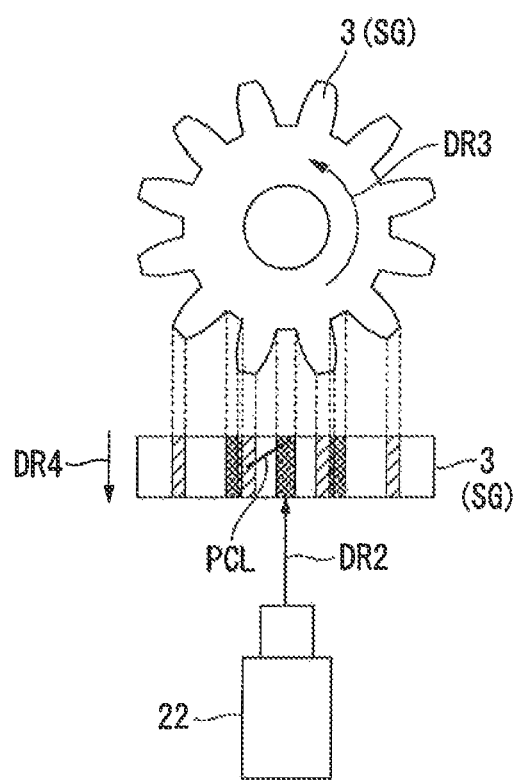

As shown in FIGS. 3A and 3B, for example, the profile measuring apparatus 100 of this embodiment is capable of measuring the profile of the object 3 on the assumption that the spur gear SG is the object 3. FIGS. 3A and 3B are configuration diagrams each showing the construction of the profile measuring apparatus 100 which measures the profile of the spur gear SG. In a case that the profile measuring apparatus 100 measures the profile of the spur gear SG, the spur gear SG as the object 3 is, for example, placed on the stage 31 so that the center of the rotational axis of the spur gear SG coincides with the center of the rotational axis θ of the stage 31. That is, the stage driving section 33 (movement section) moves and rotates the spur gear SG so that the rotational axis of the spur gear SG coincides with the rotational axis of the rotational movement.

Here, as shown in FIG. 3A, the irradiation section 21 irradiates the measurement light to the tooth plane of the spur gear SG in accordance with the irradiation direction DR1 (first direction) which is determined corresponding to the normal direction of the tooth plane of the spur gear SG. In particular, the envelope plane of the top of each tooth is assumed, and the irradiation direction DR1 is a direction perpendicular to the envelope surface in the measurement area. In this case, the imaging section 22 takes the image of the measurement light from the imaging direction DR2 (second direction) which is determined corresponding to the direction of the ridge line of the tooth of the tooth plane (surface) of the spur gear SG to which the measurement light is irradiated (direction different from the circumferential direction). That is, as shown in FIG. 3B, the imaging section 22 takes the image of the optical cutting line PCL from the direction of the ridge line of the tooth of the spur gear SG (namely the Z-axis direction) which is supposed to be the imaging direction DR2. In this case, as shown in FIG. 3B, the movement control section 54A rotates the support table 32 in the movement direction DR3 with the rotational axis θ as the rotational center. That is, the movement control section 54A moves the position of the object 3 to which the measurement light is irradiated relative to the movement direction DR3 (third direction) of the detection section 20 (holding section) which is determined corresponding to the circumferential direction. Accordingly, the profile measuring apparatus 100 measures the profile of the spur gear SG.

The profile measuring apparatus 100 of this embodiment includes the movement section 10 which moves the irradiation section 21 and the object 3 relative to each other to move the position of the measurement area to which the measurement light is irradiated in the movement direction DR3 (third direction) corresponding to the circumferential direction. The imaging section 22 takes the image of the measurement area, every time when the measurement area is displaced in the third direction, to generate a plurality of images. The coordinate calculation section 53 (measurement section) measures a plurality of concave-convex shapes based on the images. The movement section 10 moves the irradiation section 21 and the object 3 relative to each other also in the movement direction DR4 (fourth direction) which is determined corresponding to the extending direction of the concave-convex shape. In particular, the profile measuring apparatus 100 successively moves the measurement area in the direction of the ridge line of the tooth (for example, the axis direction of the rotational axis θ in FIG. 3A) while moving the measurement area in the arrangement direction of the teeth of the spur gear SG (for example, the rotation direction of the rotational axis θ in FIG. 3A). For example, the profile measuring apparatus 100 rotates the spur gear SG in the rotation direction of the rotational axis θ (for example, the movement direction DR3 (third direction) in FIG. 3B) to move the measurement area so that each tooth becomes the measurement area. Along with this, the profile measuring apparatus 100 moves the irradiation section 21 and the imaging section 22 in the axis direction of the rotational axis θ of the spur gear SG (for example, the movement direction DR4 (fourth direction) in FIG. 3B) to move the measurement area so that each position on the tooth plane becomes the measurement area. As described above, the profile measuring apparatus 100 of this embodiment is capable of successively measuring the profile of each tooth of the spur gear SG. Accordingly, the profile measuring apparatus 100 of this embodiment is capable of improving velocity for measuring the profile of the tooth plane of the gear.

In this situation, the irradiation section 21 irradiates the measurement light in accordance with the irradiation direction DR1 (first direction) which is the irradiation direction of the measurement light in which the line (optical cutting line PCL) is formed on the most convex portion and the most concave portion of the concave-convex shape of the object 3. That is, the irradiation section 21 irradiates the measurement light in accordance with the irradiation direction DR1 in which the optical cutting line PCL is formed on the top of the tooth and the bottom of the tooth of the gear as the object 3. Accordingly, the profile measuring apparatus 100 is capable of improving the velocity for measuring the profile of the tooth plane of the gear.

As described above, the imaging section 22 generates a plurality of images each taken depending on the length of the concave-convex shape of the surface of the object 3 in the circumferential direction and the length of the measurement light which is irradiated on the surface and is taken by the imaging section 22. The coordinate calculation section 53 (measurement section) measures the plurality of concave-convex shapes based on the images taken by the imaging section 22. Here, in the case that the object 3 is the gear, the dimension of the concave-convex shape of the object 3 in the circumferential direction of the gear (namely, the dimension of each tooth of the gear) corresponds to a direction of the thickness of the tooth (a tooth-thickness direction) of the gear. Further, the length of the measurement light which is irradiated on the surface and is taken by the imaging section 22 is, for example, a length of the optical cutting line PCL which is taken by the imaging section 22 in the length of the optical cutting line PCL formed on the surface of the object 3 as viewed from the imaging direction DR2. That is, in the case that the object 3 is the gear, the imaging section 22 generates the plurality of images each taken depending on the length of the tooth width of the tooth and the length of the measurement light which is irradiated on the tooth plane and is taken by the imaging section 22. That is, the imaging section 22 generates the plurality of images by taking images of the teeth of the gear respectively. In this case, the coordinate calculation section 53 (measurement section) measures profiles of the teeth based on the plurality of images.

The irradiation section 21 can irradiate the measurement light so that a direction intersecting with the circumferential direction of the object 3 is the direction of the optical cutting line PCL (line). That is, the irradiation section 21 can irradiate the measurement light, for example, so that the optical cutting line PCL is formed to be inclined to the direction of the ridge line of the tooth from the circumferential direction of the spur gear SG. In a case that any one of left and right surfaces with respect to the ridge line of the tooth is expected to be measured, the measurement light can be set to be substantially perpendicular to the surface of the tooth to be measured.

The profile measuring apparatus 100 of this embodiment can include the movement section 10, which moves the irradiation section 21 and the object 3 relative to each other, so that the position of the measurement area to which the illumination light is irradiated is moved in the movement direction DR3 (third direction) corresponding to the circumferential direction. The imaging section 22 takes the image of the object every time when the measurement area is displaced in the third direction to generate a plurality of images. The coordinate calculation section 53 (measurement section) can measure the plurality of concave-convex shapes based on the images generated by the imaging section 22. The movement section 10 can move the irradiation section 21 and the object 3 relative to each other also in the movement direction DR4 (fourth direction) which is determined corresponding to the extending direction of the concave-convex shape. As described above, the profile measuring apparatus 100 of this embodiment is capable of successively measuring the profile of each tooth of the spur gear SG. Accordingly, the profile measuring apparatus 100 of this embodiment is capable of improving the velocity for measuring the profile of the tooth plane of the gear.

The movement section 10 provided for the profile measuring apparatus 100 of this embodiment can be controlled by the movement control section 54A. In a case that one rotation is supposed to be 1 in the angle displacement amount in the movement direction DR3 (third direction) and that the dimension of the measurement area to which the measurement light is irradiated in the direction in which the concave-convex shape extends in the movement direction DR4 (fourth direction) is supposed to be 1, the movement control section 54A can perform control so that a ratio of the movement amount in the movement direction DR4 (fourth direction) with respect to the angle displacement amount in the movement direction DR3 (third direction) has a value greater than 1. For example, in a case that it is normalized so that one rotation around the rotational axis θ is 1 in the angle displacement amount in the movement direction DR3 (third direction) and that it is normalized so that the dimension of the measurement area to which the measurement light is irradiated is 1 in the direction in which the concave-convex shape extends in the movement direction DR4 (fourth direction), the movement control section 54A can perform control so that the ratio of the movement amount in the movement direction DR4 (fourth direction) with respect to the angle displacement amount in the movement direction DR3 (third direction) has a value greater than 1. Accordingly, the profile measuring apparatus 100 of this embodiment is capable of moving the measurement area in the radial direction of the rotational axis θ for every one rotation around the rotational axis θ, and thus the profile measuring apparatus 100 is capable of measuring the profile of the object 3 without overlap of each measurement area. That is, the profile measuring apparatus 100 of this embodiment is capable of improving the velocity for measuring the concave-convex shape (for example, the profile of the tooth plane of the gear).

In this case, the movement control section 54A provided for the profile measuring apparatus 100 of this embodiment can move the movement section 10 in the direction in which the concave-convex shape extends in the movement direction DR4 (fourth direction) by a consecutive movement amount depending on the angle displacement amount in the movement direction DR3 (third direction). The movement control section 54A provided for the profile measuring apparatus 100 of this embodiment can move the movement section 10 in the direction in which the concave-convex shape extends in the movement direction DR4 (fourth direction) by a stepwise movement amount depending on the angle displacement amount in the movement direction DR3 (third direction) (for example, a movement amount which increases in a stepwise manner for every one rotation around the rotational axis θ in the angle displacement amount in the movement direction DR3 (third direction)). The movement control section 54A provided for the profile measuring apparatus 100 of this embodiment can move the movement section 10 in the direction in which the concave-convex shape extends in the movement direction DR4 (fourth direction) by another stepwise movement amount depending on the angle displacement amount in the movement direction DR3 (third direction) (for example, a movement amount which increases in a stepwise manner for every displacement by a predetermined angle around the rotational axis θ in the angle displacement amount in the movement direction DR3 (third direction)).

<Measurement of Helical Gear>

For example, as shown in FIGS. 4A and 4B, the profile measuring apparatus 100 of this embodiment is capable of measuring the profile of the object 3 on the assumption that the helical gear HG is the object 3. FIGS. 4A and 4B are diagrams each showing the construction of the profile measuring apparatus 100 which measures the profile of the helical gear HG. In a case that the profile measuring apparatus 100 measures the profile of the helical gear HG, the helical gear HG as the object 3 is, for example, placed on the stage 31 so that the center of the rotational axis of the helical gear HG coincides with the center of the rotational axis θ of the stage 31. That is, the stage driving section 33 (movement section) moves and rotates the helical gear HG so that the rotational axis of the helical gear HG coincides with the rotational axis θ of the rotational movement.

In the case that the helical gear HG is measured, the profile measuring apparatus 100 set each direction as in a similar manner as in the case of the spur gear SG. For example, as shown in FIG. 4A, the irradiation section 21 irradiates the measurement light to the tooth plane of the helical gear HG in accordance with the irradiation direction DR1 (first direction) which is determined corresponding to the normal direction of the tooth plane of the helical gear HG. In this case, the imaging section 22 takes the image of the measurement light from the imaging direction DR2 (second direction) which is determined corresponding to the ridge line of the tooth direction of the tooth plane (surface) of the helical gear HG to which the measurement light is irradiated (direction different from the circumferential direction). That is, as shown in FIG. 4B, the imaging section 22 takes the image of the optical cutting line PCL from the direction of the ridge line of the tooth of the helical gear HG which is supposed to be the imaging direction DR2. In this case, as shown in FIG. 4B, the movement control section 54A rotates the support table 32 in the movement direction DR3 with the rotational axis θ as the rotational center. That is, the movement control section 54A moves the position of the object 3 to which the measurement light is irradiated relative to the movement direction DR3 (third direction) of the detection section 20 (holding section) which is determined corresponding to the circumferential direction. Accordingly, the profile measuring apparatus 100 measures the profile of the helical gear HG.

The profile measuring apparatus 100 successively moves the measurement area in the direction of the ridge line of the tooth (for example, the axis direction of the rotational axis θ in FIG. 4A) while moving the measurement area in the arrangement direction of the teeth of the helical gear HG (for example, the rotation direction of the rotational axis θ in FIG. 4A). For example, the profile measuring apparatus 100 rotates the helical gear HG in the rotation direction of the rotational axis θ (for example, the movement direction DR3 (third direction) in FIG. 4B) to move the measurement area so that each tooth becomes the measurement area. Along with this, the profile measuring apparatus 100 moves the irradiation section 21 and the imaging section 22 in the axis direction of the rotational axis θ of the helical gear HG (for example, the movement direction DR4 (fourth direction) in FIG. 4B) to move the measurement area so that each position on the tooth plane can be included in the measurement area. As described above, the profile measuring apparatus 100 of this embodiment is capable of successively measuring the profile of each tooth of the helical gear HG. Accordingly, the profile measuring apparatus 100 of this embodiment is capable of improving the velocity for measuring the profile of the tooth plane of the gear.

<Measurement of Bevel Gear>

Figure 5A:
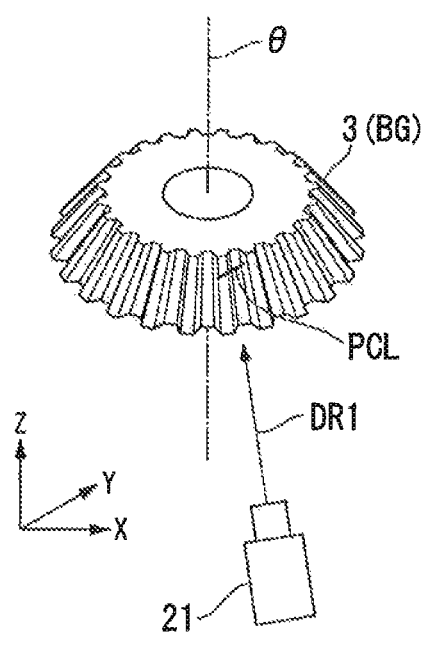
FIGS. 5A and 5B are configuration diagrams each showing a direction in which a profile of an object to be measured (bevel gear) is measured according to the first embodiment.
Figure 5B:
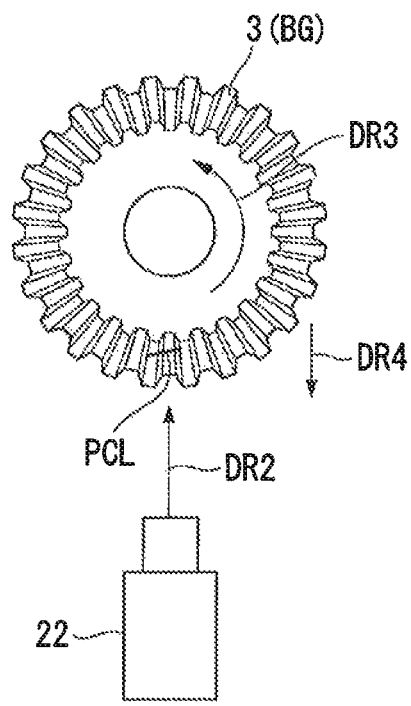

For example, as shown in FIGS. 5A and 5B, the profile measuring apparatus 100 of this embodiment is capable of measuring the profile of the object 3 on the assumption that the bevel gear BG is the object 3. FIGS. 5A and 5B are diagrams each showing the construction of the profile measuring apparatus 100 which measures the profile of the bevel gear BG. In a case that the profile measuring apparatus 100 measures the profile of the bevel gear BG, the bevel gear BG as the object 3 is, for example, placed on the stage 31 so that the center of the rotational axis of the bevel gear BG coincides with the center of the rotational axis θ of the stage 31. That is, the stage driving section 33 (movement section) moves and rotates the bevel gear BG so that the rotational axis of the bevel gear BG coincides with the rotational axis θ of the rotational movement.

As shown in FIG. 5A, the irradiation section 21 irradiates the measurement light to the tooth plane of the bevel gear BG in accordance with the irradiation direction DR1 (first direction) which is determined corresponding to the normal direction of the tooth plane of the bevel gear BG. In this case, the imaging section 22 takes the image of the measurement light from the imaging direction DR2 (second direction) which is determined corresponding to the direction of the ridge line of the tooth of the tooth plane (surface) of the bevel gear BG to which the measurement light is irradiated (direction different from the circumferential direction). That is, as shown in FIG. 5B, the imaging section 22 takes the image of the optical cutting line PCL from the direction of the ridge line of the tooth of the bevel gear BG which is supposed to be the imaging direction DR2. In this case, as shown in FIG. 5B, the movement control section 54A rotates the support table 32 in the movement direction DR3 with the rotational axis θ as the rotational center. That is, the movement control section 54A relatively moves the position of the object 3 to which the measurement light is irradiated in the movement direction DR3 (third direction) of the detection section 20 (holding section) which is determined corresponding to the circumferential direction. Accordingly, the profile measuring apparatus 100 measures the profile of the bevel gear BG.

The profile measuring apparatus 100 successively moves the measurement area in the direction of the ridge line of the tooth (for example, a direction intersecting with the axis direction of the rotational axis θ in FIG. 5A) while moving the measurement area in the arrangement direction of the teeth of the bevel gear BG (for example, the rotation direction of the rotational axis θ in FIG. 5A). For example, the profile measuring apparatus 100 rotates the bevel gear BG in the rotation direction of the rotational axis θ (for example, the movement direction DR3 (third direction) in FIG. 5B) to move the measurement area so that each tooth becomes the measurement area. Along with this, the profile measuring apparatus 100 moves the irradiation section 21 and the imaging section 22 in the direction intersecting with the axis direction of the rotational axis θ of the bevel gear BG (for example, the movement direction DR4 (fourth direction) in FIG. 5B) to move the measurement area so that each position on the tooth plane is included in the measurement area. As described above, the profile measuring apparatus 100 of this embodiment is capable of successively measuring the profile of each tooth of the bevel gear BG. Accordingly, the profile measuring apparatus 100 of this embodiment is capable of improving the velocity for measuring the profile of the tooth plane of the gear.

<Measurement of Spiral Bevel Gear>

For example, as shown in FIGS. 6A and 6B, the profile measuring apparatus 100 of this embodiment is capable of measuring the profile of the object 3 on the assumption that the spiral bevel gear SBG is the object 3. FIGS. 6A and 6B are diagrams each showing the construction of the profile measuring apparatus 100 which measures the profile of the spiral bevel gear SBG. In a case that the profile measuring apparatus 100 measures the profile of the spiral bevel gear SBG, the spiral bevel gear SBG as the object 3 is, for example, placed on the stage 31 so that the center of the rotational axis of the spiral bevel gear SBG coincides with the center of the rotational axis θ of the stage 31. That is, the stage driving section 33 (movement section) rotates the spiral bevel gear SBG so that the rotational axis of the spiral bevel gear SBG coincides with the rotational axis θ of the rotational movement.

As shown in FIG. 6A, the irradiation section 21 irradiates the measurement light to the tooth plane of the spiral bevel gear SBG in accordance with the irradiation direction DR1 (first direction) which is determined corresponding to the normal direction of the tooth plane of the spiral bevel gear SBG. In this case, the imaging section 22 takes the image of the measurement light from the imaging direction DR2

(second direction) which is determined corresponding to the direction of the ridge line of the tooth of the tooth plane (surface) of the spiral bevel gear SBG to which the measurement light is irradiated (direction different from the circumferential direction). That is, as shown in FIG. 6B, the imaging section 22 takes the image of the optical cutting line PCL from the direction of the ridge line of the tooth of the spiral bevel gear SBG which is supposed to be the imaging direction DR2. Noted that the direction of the ridge line of the tooth of the spiral bevel gear SBG changes depending on the position in the radial direction of the spiral bevel gear SBG, and thus the orientation of the optical probe 20A is changed by the head rotation mechanism 13a based on which position, among the positions of the spiral bevel gear SBG in the radial direction, corresponds to the measurement area. Accordingly, it is possible to change the imaging direction of the linear projection pattern. In this case, as shown in FIG. 6B, the movement control section 54A rotates the support table 32 in the movement direction DR3 with the rotational axis θ as the rotational center. That is, the movement control section 54A relatively moves the position of the object 3 to which the measurement light is irradiated in the movement direction DR3 (third direction) of the detection section 20 (holding section) which is determined corresponding to the circumferential direction. Accordingly, the profile measuring apparatus 100 measures the profile of the spiral bevel gear SBG.

The profile measuring apparatus 100 successively moves the measurement area in the direction of the ridge line of the tooth (for example, a direction which is torsional about the axis direction of the rotational axis θ in FIG. 6A) while moving the measurement area in the arrangement direction of the teeth of the spiral bevel gear SBG (for example, the rotation direction of the rotational axis θ in FIG. 6A). For example, the profile measuring apparatus 100 rotates the spiral bevel gear SBG in the rotation direction of the rotational axis θ (for example, the movement direction DR3 (third direction) in FIG. 6B) to move the measurement area so that each tooth is included in the measurement area. Along with this, the profile measuring apparatus 100 moves the irradiation section 21 and the imaging section 22 in the direction which is torsional about the axis direction of the rotational axis θ of the spiral bevel gear SBG (for example, the movement direction DR4 (fourth direction) in FIG. 6B) to move the measurement area so that each position on the tooth plane is included in the measurement area. As described above, the profile measuring apparatus 100 of this embodiment is capable of successively measuring the profile of each tooth of the spiral bevel gear SBG. Accordingly, the profile measuring apparatus 100 of this embodiment is capable of improving the velocity for measuring the profile of the tooth plane of the gear.

<Measurement of Worm Gear>

Figure 7A:
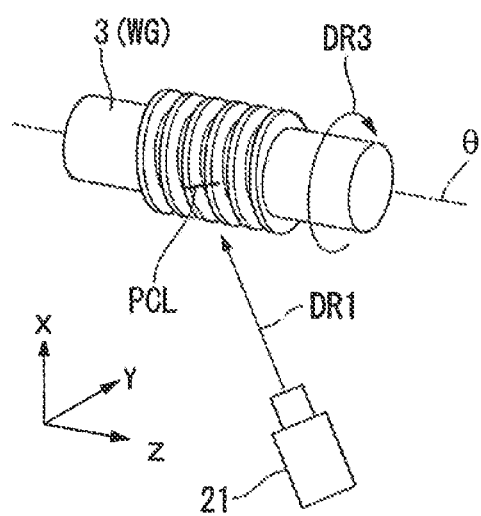
FIGS. 7A and 7B are configuration diagrams each showing a direction in which a profile of an object to be measured (worm gear) is measured according to the first embodiment.
Figure 7B:
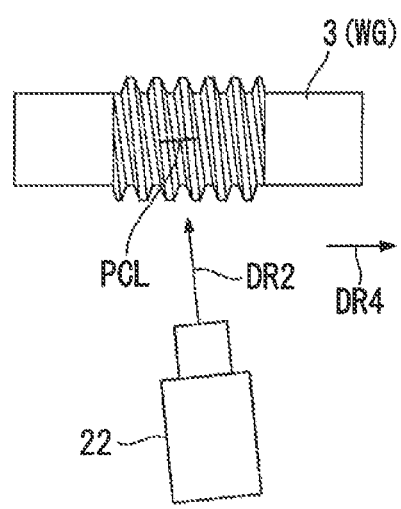

For example, as shown in FIGS. 7A and 7B, the profile measuring apparatus 100 of this embodiment is capable of measuring the profile of the object 3 on the assumption that the worm gear WG is the object 3. FIGS. 7A and 7B are diagrams each showing the construction of the profile measuring apparatus 100 which measures the profile of the worm gear WG. In a case that the profile measuring apparatus 100 measures the profile of the worm gear WG, the worm gear WG as the object 3 is, for example, placed on the stage 31 so that the center of the rotational axis of the worm gear WG coincides with the center of the rotational axis θ of the stage 31. That is, the stage driving section 33 (movement section) rotates the worm gear WG so that the rotational axis of the worm gear WG coincides with the rotational axis θ of the rotational movement. Note that the irradiation section 21 and the imaging section 22 are rotatable around z axis (rotatable in θ z direction) by a rotation mechanism (not shown) while maintaining their relative position.

As shown in FIG. 7A, the irradiation section 21 irradiates the measurement light to the tooth plane of the worm gear WG in accordance with the irradiation direction DR1 (first direction) which is determined corresponding to the normal direction of the tooth plane of the worm gear WG. In particular, the envelope plane of the top of each tooth is assumed, and the irradiation direction DR1 is a direction perpendicular to the envelope surface in the measurement area. In this case, the imaging section 22 takes the image of the measurement light from the imaging direction DR2 (second direction) which is determined corresponding to the ridge line of the tooth direction of the tooth plane (surface) of the worm gear WG to which the measurement light is irradiated (direction different from the circumferential direction). That is, as shown in FIG. 7B, the imaging section 22 takes the image of the optical cutting line PCL from the ridge line of the tooth direction of the worm gear WG which is supposed to be the imaging direction DR2. In this case, as shown in FIG. 7A, the movement control section 54A rotates the support table 32 in the movement direction DR3 with the rotational axis θ as the rotational center. That is, the movement control section 54A relatively moves the position of the object 3 to which the measurement light is irradiated in the movement direction DR3 (third direction) of the detection section 20 (holding section) which is determined corresponding to the circumferential direction. As described above, the profile measuring apparatus 100 measures the profile of the worm gear WG. In a case that any one of left and right surfaces with respect to the ridge line of the tooth is expected to be measured, the measurement light can be set to be substantially perpendicular to the surface of the tooth to be measured.

The profile measuring apparatus 100 successively moves the measurement area in the direction of the ridge line of the tooth (for example, a rotation direction of the rotational axis θ in FIG. 7A) while moving the measurement area in the arrangement direction of the teeth of the worm gear WG (for example, the axis direction of the rotational axis θ in FIG. 7A). For example, the profile measuring apparatus 100 rotates the worm gear WG in the rotation direction of the rotational axis θ (for example, the movement direction DR3 (third direction) in FIG. 7B) to move the measurement area so that each position on the tooth plane is included in the measurement area. Along with this, the profile measuring apparatus 100 moves the irradiation section 21 and the imaging section 22 in the axis direction of the rotational axis θ of the worm gear WG (for example, the movement direction DR4 (fourth direction) in FIG. 7B) to move the measurement area so that each tooth is included in the measurement area. As described above, the profile measuring apparatus 100 of this embodiment is capable of successively measuring the profile of each tooth of the worm gear WG. Accordingly, the profile measuring apparatus 100 of this embodiment is capable of improving the velocity for measuring the profile of the tooth plane of the gear.

Figure 8:
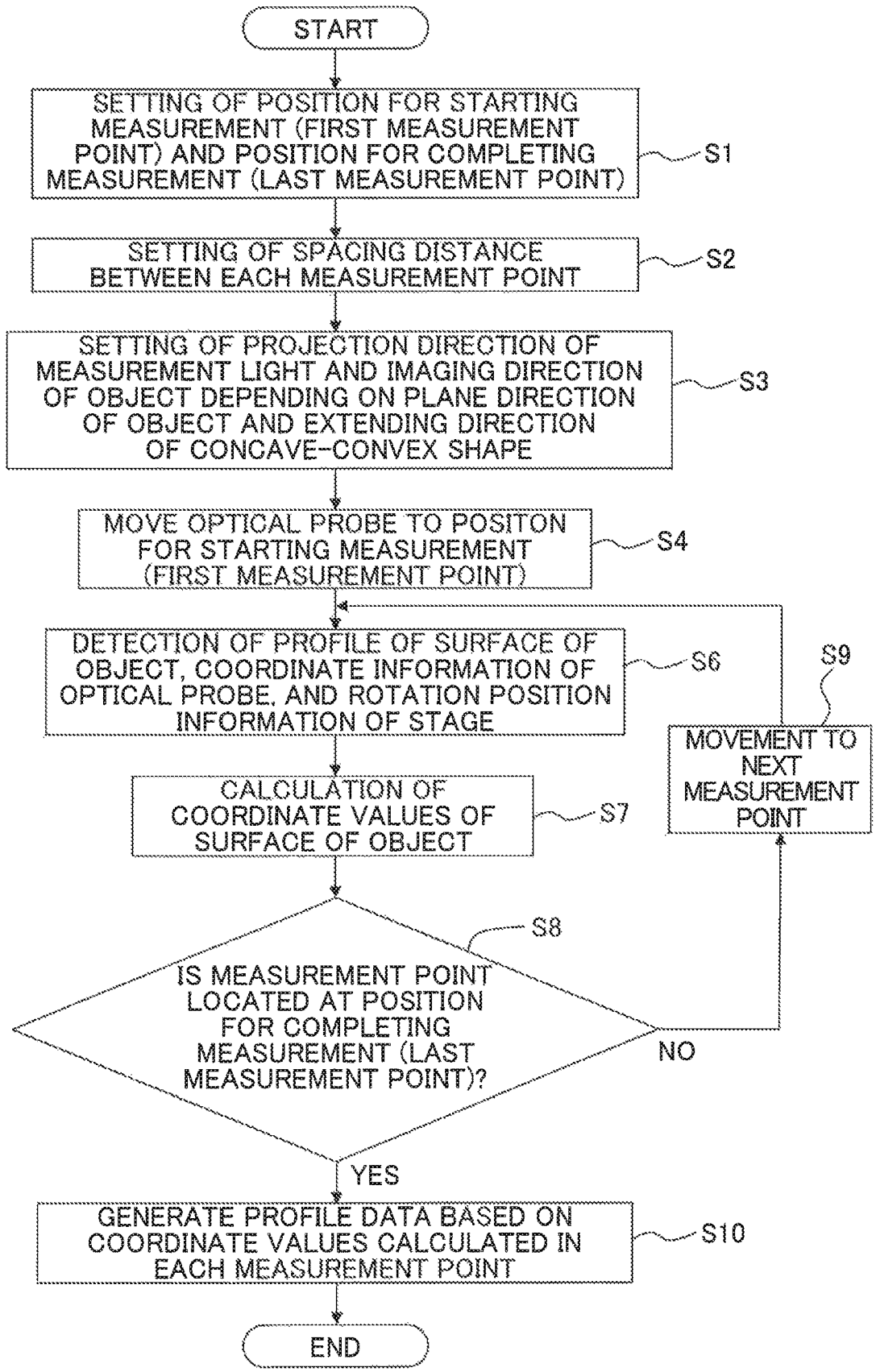
FIG. 8 is a flowchart showing an operation of a control section of the first embodiment.

Next, an explanation will be made about a process in which the profile measuring apparatus 100 executes the profile measurement of the object 3 with reference to the flowchart shown in FIG. 8. FIG. 8 is a flowchart showing an example of a profile measurement process in this embodiment.

At first, the user sets a position for starting the measurement of the object 3 (first measurement point) and a position for completing the measurement (last measurement point) by inputting them through the input device 42. The input device 42 makes the storage section 55 store the position for starting the measurement (first measurement point) and the position for completing the measurement (last measurement point), those of which are inputted through the input device 42, therein (step S1). Further, the spacing distance between each measurement point of the object 3 is inputted and set through the input device 42 by the user. The input device 42 makes the storage section 55 store the spacing distance between each measurement point inputted therefrom (step S2). Next, the projection direction and the imaging direction of the measurement light are set based on element data of the gear at the measurement point of the object 3. In particular, the projection direction is set according to the direction of the tooth plane of the gear; and the imaging direction is set in the direction of the ridge line of the tooth of the gear. As described above, the direction of the ridge line of the tooth of the gear is obtained by the position setting section 58 and the obtained data is send to the movement command section 56. The movement command section 56 reads coordinate values of the position for starting the measurement (first measurement point) and the position for completing the measurement (last measurement point) and data indicating the spacing distance between each measurement point (for example, the measurement pitch of the certain spacing distance), those of which are pieces of information set after being inputted from the storage section 55, coordinate values of the measurement point indicating the measurement range which is preset information, the movement direction of the measurement point, and the like. The movement command section 56 calculates the movement route of scan with respect to the object 3 based on the read data and the obtained data from the position setting section 58 (step S3).

Next, the movement command section 56 supplies the command signal for driving the measurement head 13 and the stage 31 to the driving command section 54 based on the calculated movement route to drive the measurement head 13 and the stage 31 by the head driving section 14 and the stage driving section 33 (movement section). Accordingly, the movement command section 56 moves the optical probe 20A to the position for starting the measurement of the object 3 (first measurement point) by moving the relative position between the measurement head 13 and the stage 31 (step S4).

Next, the interval adjustment section 52 detects the profile of the surface of the object 3 via the optical probe 20A to supply the detected image information to the coordinate calculation section 53. The coordinate detection section 51 detects the coordinate information of the optical probe 20A and the rotation position information of the stage 31 by the position detection section 17 to supply the detected information to the coordinate calculation section 53 (step S6).

The coordinate calculate section 53 calculates the point group data of the coordinate values (three-dimensional coordinate values) of the measurement point based on the coordinate information of the optical probe 20A and the rotation position information of the stage 31, those of which are supplied from the coordinate detection section 51, and the image information supplied from the interval adjustment section 52 to store the point group data in the storage section 55 (step S7).

Next, the movement command section 56 judges as to whether or not the measurement point measured most recently is the position for completing the measurement (last measurement point) (step S8). In the step S8, in a case that it is judged that the measurement point measured most recently is not the position for completing the measurement (last measurement point), the movement command section 56 moves the optical probe 20A to the next measurement point and then stops the optical probe 20A. For example, in order to move the optical probe 20A to the next measurement point in accordance with the movement route, the movement command section 56 supplies the command signal for driving the measurement head 13 and the stage 31 to the driving control section 54 to drive the measurement head 13 and the stage 31 by the head driving section 14 and the stage driving section 33 (movement section) (step S9). Then, the process returns to the step S6 by the movement command section 56.

On the other hand, in the step S8, in a case that it is judged that the measurement point measured most recently is the position for completing the measurement (last measurement point), the coordinate calculate section 53 calculates the profile data of the surface of the object 3 based on the point group data of the coordinate values (three-dimensional coordinate values) calculated in each measurement point. For example, the coordinate calculation section 53 reads, from the storage section 55, the point group data of the coordinate values (three-dimensional coordinate values) calculated for each measurement point based on the image information detected by the optical probe 20A via the interval adjustment section 52 and the coordinate information of the optical probe 20A and the rotation position information of the stage 31 detected by the coordinate detection section 51; and calculates the point group data of the three-dimensional coordinate values as the profile data of the surface of the object 3 to store the point group data in the storage section 55 (step S10).

As described above, the profile measuring apparatus 100 of this embodiment includes the irradiation section 21 which irradiates the measurement light which has the light amount distribution depending on the surface of the object 3 having concave-convex shape, which is periodically aligned in the circumferential direction and extends in the direction different from the circumferential direction, to the surface of the object 3, in accordance with the irradiation direction DR1 (first direction) which is determined corresponding to the normal direction of the surface. The profile measuring apparatus 100 includes the imaging section 22 which takes the image of the measurement light from the imaging direction DR2 (second direction), which is determined corresponding to the direction different from the circumferential direction in the surface to which the measurement light is irradiated, to generate the image. The profile measuring apparatus 100 includes the coordinate calculation section 53 (measurement section) which measures the profile of the surface based on the position of the measurement light in the image taken by the imaging section 22. Accordingly, the profile measuring apparatus 100 is capable of setting accuracy for measuring the profile of the surface of the object 3 depending on resolution of the imaging section 22 which takes the image of the measurement light. That is, the profile measuring apparatus 100 of this embodiment can accurately measure the profile of the surface of the object 3.

Figure 9:
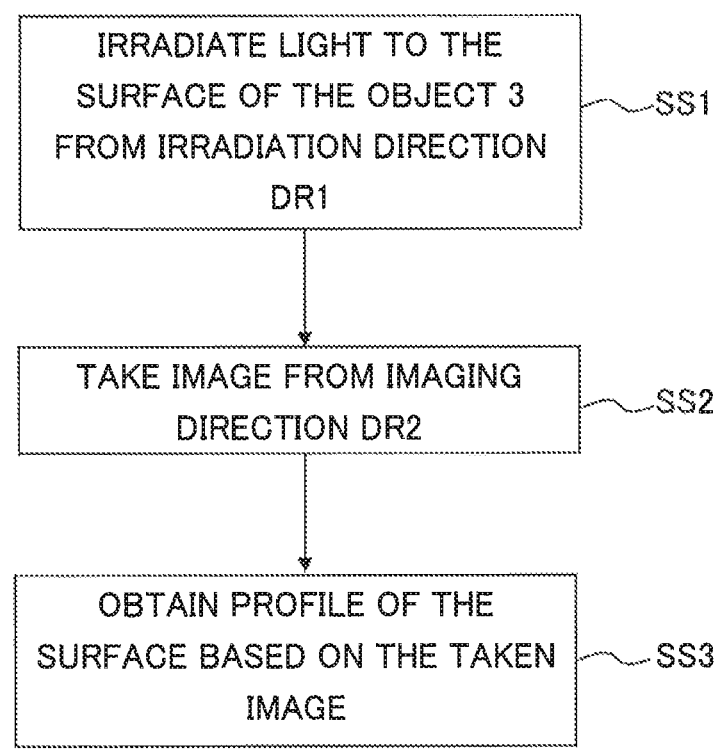
FIG. 9 is a flowchart showing a method for measuring a profile of an object.

As shown in FIG. 9, in a case that the profile of the object 3 is measured, the measurement light which has the light amount distribution depending on the surface of the object 3 having concave-convex shape is irradiated to the surface of the object 3, in accordance with the irradiation direction DR1 (first direction) which is determined corresponding to the normal direction of the surface, wherein the concave-convex shape of the object 3 is periodically aligned in the circumferential direction and extends in the direction different from the circumferential direction (step SS1). The image of the measurement light from the imaging direction DR2 (second direction) is taken to generate the image, wherein the imaging direction DR2 is determined corresponding to the direction different from the circumferential direction in the surface to which the measurement light is irradiated (step SS2). The profile of the surface is obtained based on the position of the measurement light in the taken image taken (step SS3).

The profile measuring apparatus 100 of this embodiment includes the stage driving section 33 (movement section) which relatively moves the position of the object 3 to which the measurement light is irradiated in the movement direction DR3 (third direction) of the detection section 20 (holding section) which is determined corresponding to the circumferential direction. The imaging section 22 generates the plurality of images each taken depending on the length of the concave-convex shape in the circumferential direction and the length of the measurement light which is irradiated on the surface and is taken by the imaging section 22. The coordinate calculation section 53 (measurement section) measures the plurality of concave-convex shapes based on the images taken by the imaging section 22. Accordingly, the profile measuring apparatus 100 of this embodiment can consecutively measure the profile of the surface of each of the concave-convex shapes (for example, teeth of the gear). That is, the profile measuring apparatus 100 of this embodiment is capable of shortening the time for measuring the profile of the surface of the object 3.

The profile measuring apparatus 100 of this embodiment also includes the detection section 20 (holding section) holding the irradiation section 21 and the imaging section 22, and the stage driving section 33 (movement section) moves the detection section 20 (holding section) with respect to the object 3 in the movement direction DR3 (third direction) of the detection section 20 (holding section). Accordingly, the profile measuring apparatus 100 of this embodiment can consecutively measure the profile of the surface of each of the concave-convex shapes (for example, teeth of the gear). That is, the profile measuring apparatus 100 of this embodiment is capable of shortening the time for measuring the profile of the surface of the object 3.

The profile measuring apparatus 100 of this embodiment also includes the movement control section 54A which relatively rotates the object 3 in the movement direction DR3 (third direction) of the detection section 20 (holding section) to relatively move the position to which the measurement light is irradiated in the movement direction DR3 (third direction) of the detection section 20 (holding section). Accordingly, the profile measuring apparatus 100 can measure the profile of the surface of the object 3 having the concave-convex shape, which is periodically aligned in the circumferential direction and extends in the direction different from the circumferential direction, by performing continuous operation. That is, the profile measuring apparatus 100 of this embodiment is capable of shortening the time for measuring the profile of the surface of the object 3.

The profile measuring apparatus 100 of this embodiment also includes the velocity control section 54B which controls the movement velocity for moving and rotating the object 3 relative to and depending on the position in the stage-radius rs direction (radial direction) of the rotational movement of the object 3 to which the measurement light is irradiated. For example, the profile measuring apparatus 100 of this embodiment measures the outer circumferential portion of the object 3 at rotation velocity slower than that of when the inner circumferential portion of the object 3 is measured.

Accordingly, the profile measuring apparatus 100 can perform the measurement such that density of measurement points in the inner circumferential portion and density of measurement points in the outer circumferential portion, of the object 3 which has the surface having the concave-convex shape which is periodically aligned in the circumferential direction and extends in the direction different from the circumferential direction, are uniformized.

The stage driving section 33 (movement section) of the profile measuring apparatus 100 of this embodiment rotates the object 3 so that the central axis AX of the object 3 coincides with the rotational axis θ of the rotational movement. Accordingly, the profile measuring apparatus 100 can shorten a movement distance in a case that the position to which the measurement light is irradiated is relatively moved in the movement direction DR3 (third direction) of the detection section 20 (holding section). That is, the profile measuring apparatus 100 can stably move the position to which the measurement light is irradiated.

The profile measuring apparatus 100 of this embodiment includes the storage section 55 in which the position in the extending direction of the concave-convex shape is associated with information, which indicates the extending direction of the concave-convex shape for each position in the extending direction of the concave-convex shape, and the association is stored in advance. Accordingly, the profile measuring apparatus 100 is capable of automatizing operation for relatively moving the position of the object 3 to which the measurement light is irradiated in the movement direction DR3 (third direction). That is, the profile measuring apparatus 100 of this embodiment can reduce the burden to an operator performing measurement operation of the profile of the surface of the object 3.

The measurement light of the profile measuring apparatus 100 of this embodiment has the light amount distribution which is formed in the line form in a case that the measurement light is irradiated to the horizontal plane. Accordingly, the profile measuring apparatus 100 is capable of measuring profiles of a plurality of portions of the object 3, which are continuously formed, at the same time. That is, the profile measuring apparatus 100 can shorten the time for measuring the profile of the surface of the object 3.

The irradiation section 21 of the profile measuring apparatus 100 of this embodiment irradiates the measurement light so that the direction intersecting with the circumferential direction of the object 3 is supposed to be the direction of the line (optical cutting line PCL). Accordingly, the imaging section 22 is capable of taking the image of the measurement light including more information with respect to the profile of the surface of the object 3 as compared with a case in which the optical cutting line PCL is not inclined. That is, the profile measuring apparatus 100 can measure the profile of the object 3 in a period of time shorter than the case in which the optical cutting line PCL is not inclined.

The irradiation direction DR1 (first direction) of the profile measuring apparatus 100 of this embodiment is an irradiation direction of the measurement light in which the line is formed on the most convex portion and the most concave portion of the concave-convex shape of the object 3. The profile measuring apparatus 100 is capable of measuring the profiles of the plurality of portions of the object 3, which are continuously formed, at the same time. That is, the profile measuring apparatus 100 can shorten the time for measuring the profile of the surface of the object 3.

The profile measuring apparatus 100 of this embodiment includes the irradiation section 21 which irradiates the measurement light, which has the light amount distribution depending on the profile of the surface of each tooth of the gear as the object 3, to the tooth plane in accordance with the irradiation direction DR1 (first direction) which is determined corresponding to the normal direction of the tooth plane of each tooth. The profile measuring apparatus 100 of this embodiment includes the imaging section 22 which takes the image of the optical cutting line from the imaging direction DR2 (second direction), which is determined corresponding to the direction of ridge line of the tooth of the tooth plane to which the measurement light is irradiated, to generate the image. The profile measuring apparatus 100 of this embodiment includes the coordinate calculation section 53 (measurement section) which measures the profile of the tooth based on the position of the measurement light in the image taken by the imaging section 22. Accordingly, the profile measuring apparatus 100 is capable of setting accuracy for measuring the profile of the surface of the gear (including any gear such as the turbine) as the object 3 depending on the resolution of the imaging section 22 which takes the image of the measurement light. That is, the profile measuring apparatus 100 of this embodiment can accurately measure the profile of the surface of the object 3.

The profile measuring apparatus 100 of this embodiment includes the stage driving section 33 (movement section) which relatively moves the position of the object 3 to which the measurement light is irradiated in the movement direction DR3 (third direction) of the detection section 20 (holding section) which is determined corresponding to the direction of the tooth width of the tooth. The imaging section 22 generates the plurality of images each taken depending on the length of the tooth width of the tooth and the length of the measurement light which is irradiated on the tooth plane and is taken by the imaging section 22. The coordinate calculation section 53 (measurement section) measures profiles of the teeth of the gear based on the plurality of images. Accordingly, the profile measuring apparatus 100 of this embodiment can consecutively measure the profile of the surface of each of the teeth of the gear. That is, the profile measuring apparatus 100 of this embodiment is capable of shortening the time for measuring the profile of the surface of the object 3.

The profile measuring apparatus 100 of this embodiment further includes the movement control section 54A which relatively rotates the gear in the movement direction DR3 (third direction) of the detection section 20 (holding section) to move the position to which the measurement light is irradiated relative to the movement direction DR3 (third direction) of the detection section 20 (holding section). Accordingly, the profile measuring apparatus 100 can measure the profile of the surface of the gear as the object 3 by performing the continuous operation. That is, the profile measuring apparatus 100 of this embodiment is capable of shortening the time for measuring the profile of the surface of the object 3.

In the above embodiment, the construction in which the stage driving section 33 (movement section) moves the stage 31 is explained. However, the construction is not limited thereto. For example, the profile measuring apparatus 100 can move the detection section 20 (holding section) with respect to the object 3 in the movement direction DR3 (third direction) of the detection section 20 (holding section). That is, the profile measuring apparatus 100 can be configured such that the movement section 10 moves the detection section 20 (holding section) in the movement section DR3 (third direction). Accordingly, for example, in a case that the object 3 is heavy, it is possible to measure the profile of the surface of the object 3 without moving the object 3. In the above embodiment, a tilting mechanism adjusting a tilt angle is provided for the stage 31 and thereby making it possible to adjust the projection direction of the measurement light depending on the surface of the object 3 having the concave-convex shape to be subjected to the measurement. Further, the rotation mechanism which rotates the optical probe 20A with respect to the axis parallel to the Z-axis is provided and thereby making it possible that the imaging direction is along the extending direction of the concave-convex shape. However, the present teaching is not limited thereto and the following configuration is also allowable. That is, there are provided a joint mechanism which tilts the optical probe around the X-axis or the Y-axis and a rotation mechanism which rotates the optical probe between the joint mechanism and the optical probe, and thereby making possible to take the image of the portion to which the measurement light is projected in a predetermined direction while projecting the measurement light in the predetermined direction. It is possible to configure that the irradiation section 21 and the imaging section 22 are rotatable around at least one of x axis (rotatable in θx direction), y axis (rotatable in θy direction) and z axis (rotatable in θz direction), while maintaining the relative position between the irradiation section 21 and the imaging section 22.

The irradiation direction DR1 (first direction) of the irradiation section 21 can be inclined toward a height direction of the tooth rather than the direction connecting the edge portion and the valley portion of the concave-convex shape. For example, the irradiation direction DR1 (first direction) can be a direction in which the measurement light is irradiated to the edge portion (for example, the most convex portion) and the valley portion (for example, the most concave portion) in the concave-convex shape of the object 3. Accordingly, it is possible for the profile measuring apparatus 100 to reduce that the measurement light is blocked by the object 3, and thus it is possible to measure even the profile of the valley portion (for example, the most concave portion) of the object 3.

The irradiation direction DR1 (first direction) of the irradiation section 21 can be a direction which corresponds to the normal direction of the plane included in the measurement area. For example, the irradiation direction DR1 (first direction) can be a direction which coincides with the normal direction of the plane included in the measurement area. Accordingly, the profile measuring apparatus 100 can reduce the line width on the measurement surface of the measurement light which is irradiated in a line form with respect to the plane (measurement surface) included in the measurement area as compared with a case in which the measurement light is irradiated from a direction which does not correspond to the normal direction. The smaller the line width on the measurement surface of the measurement light is, the more accurately the profile of the object 3 can be measured. That is, the profile measuring apparatus 100 is capable of improving the accuracy for measuring the profile of the object 3.

Second Embodiment

Figure 10:
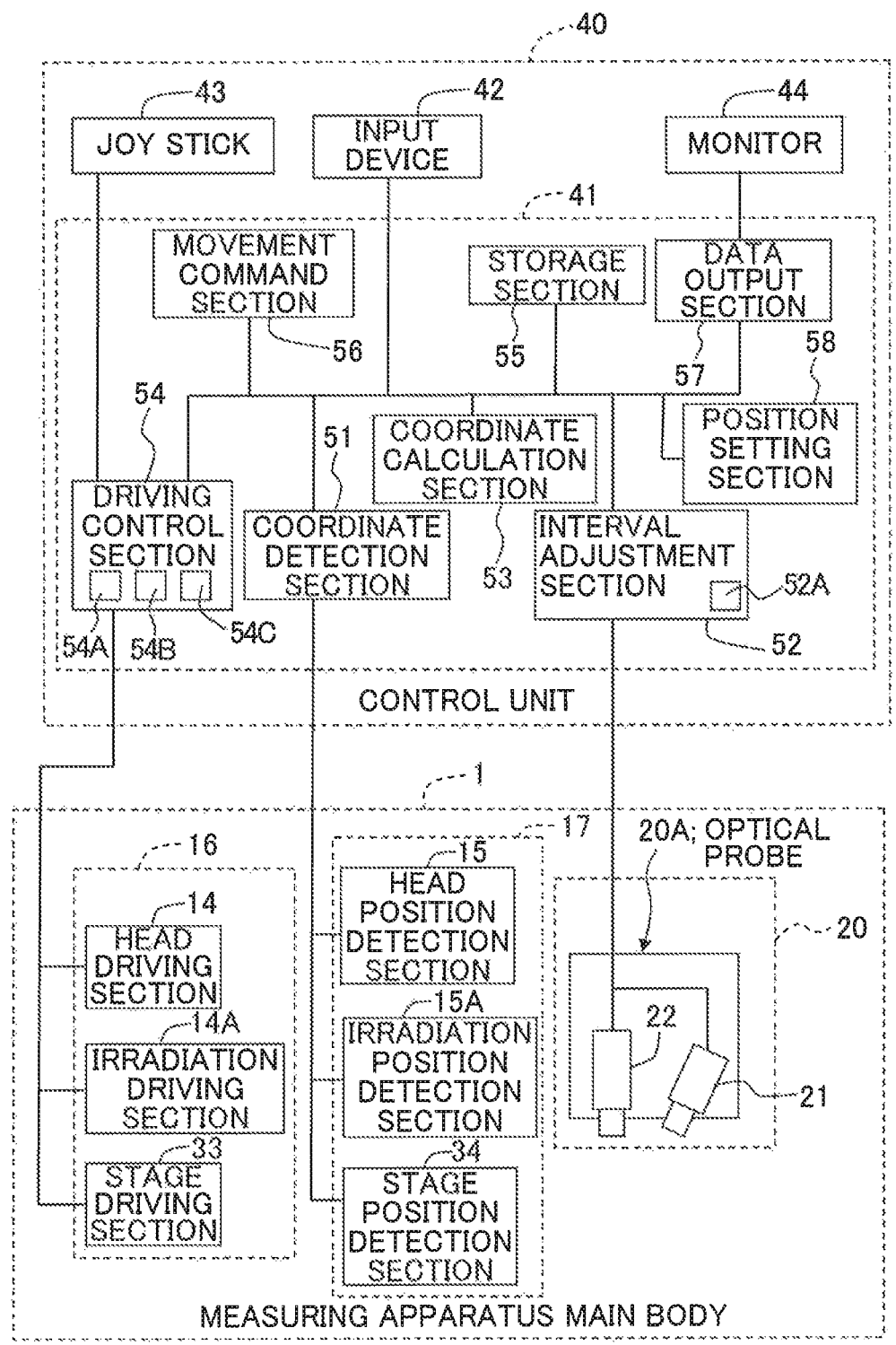
FIG. 10 is a configuration diagram showing a configuration of a profile measuring apparatus according to the second embodiment of the present teaching.

Next, an explanation will be made about the second embodiment of the present teaching with reference to FIG. 10 and FIG. 11. An explanation of the structure(s) which is/are the same as that (those) of the first embodiment will be omitted. FIG. 10 schematically shows an example of the configuration of the profile measuring apparatus 100 according to this embodiment.

The driving section 16 provided for the profile measuring apparatus 100 of this embodiment includes an irradiation driving section 14A. The irradiation driving section 14A drives the irradiation section 21 so that the irradiation section 21 is movable independently of the imaging section 22. The irradiation driving section 14A of the profile measuring apparatus 100 of this embodiment is, for example, provided in the detection section 20 (holding section) to drive the irradiation section 21.

The position detection section 17 provided for the profile measuring apparatus 100 of this embodiment includes an irradiation-position detection section 15A. The irradiation-position detection section 15A includes an X-axis encoder, a Y-axis encoder, and a Z-axis encoder which detect positions of the X-axis, the Y-axis, and the Z-axis directions of the irradiation section 21, respectively. The irradiation-position detection section 15A detects the coordinates of the irradiation section 21 by these encoders to supply the signals indicating the coordinate values of the irradiation section 21 to the coordinate detection section 51 as will be described later. The irradiation-position detection section 15A of the profile measuring apparatus 100 of this embodiment is disposed on, for example, the detection section 20 (holding section) to detect the position of the irradiation section 21. The coordinate calculation section 53 (measurement section) of this embodiment calculates the coordinates of the object 3 based on the position of the irradiation section 21 detected by the irradiation-position detection section 15A.

In the storage section 55 provided for the profile measuring apparatus 100 of this embodiment, for each of the types of the objects 3, the position in the extending direction of the concave-convex shape of the object 3 is associated with information, which indicates the extending direction of the concave-convex shape for each position in the extending direction of the concave-convex shape, and the association is stored in advance. In the storage section 55 of this embodiment, for example, for each of the types of the gears, the position in the direction of the ridge line of the tooth of the gear is associated with information, which indicates the direction of the ridge line of the tooth for each position in the direction of the ridge line of the tooth, and an the association is stored in advance.

The driving control section 54 provided for the profile measuring apparatus 100 of this embodiment includes an irradiation movement control section 54C (second movement control section). The irradiation movement control section 54C (second movement control section) reads information which indicates the extending direction of the concave-convex shape associated with the present position in the extending direction of the concave-convex shape to which the measurement light is irradiated, from among the pieces of information which indicate the extending directions of the concave-convex shapes stored in the storage section 55, as information which indicates the extending direction of the concave-convex shape corresponding to the movement direction DR4 (fourth direction) at the position to which the measurement light is irradiated. For example, in the case that the profile of the gear is measured, the movement control section 54A of this embodiment reads information which indicates the direction of the ridge line of the tooth associated with the present position in the direction of the ridge line of the tooth to which the measurement light is irradiated, from among pieces of information which indicate the direction of the ridge line of the tooth of the gear stored in the storage section 55, as information which indicates the direction corresponding to the movement direction DR4 of the optical probe 20A. That is, the movement control section 54A of this embodiment reads, from the storage section 55, the movement direction DR4 of the optical probe 20A based on the present position of the optical probe 20A detected by the head position detection section 15.

Figure 11:
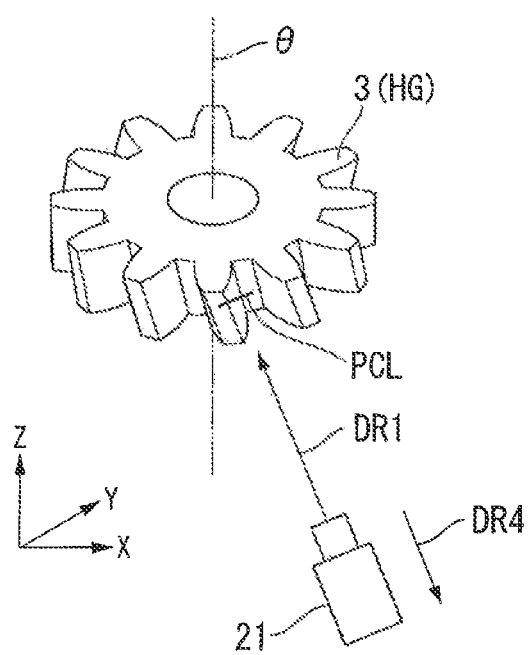
FIG. 11 is a configuration diagram showing an irradiation direction of light toward the object (helical gear).

Further, in this case, as shown in FIG. 11, an irradiation movement control section 54C (second movement control section) moves the position to which the measurement light is irradiated in the movement direction DR4 (fourth direction), of the position to which the measurement light is irradiated, which is determined corresponding to the extending direction of the concave-convex shape. FIG. 11 is a configuration diagram showing an example of a direction in which the position to which the measurement light is irradiated is moved by the irradiation movement control section 54C (second movement control section). That is, the irradiation movement control section 54C (second movement control section) moves the irradiation section 21 in the direction of the ridge line of the tooth of the helical gear HG to move the position to which the measurement light is irradiated.

As described above, the profile measuring apparatus 100 of this embodiment is capable of moving the irradiation section 21 independently of the imaging section 22 to move the position to which the measurement light is irradiated. Accordingly, the profile measuring apparatus 100 is capable of measuring the profile while moving the position to which the measurement light is irradiated depending on the profile of the surface of the object 3. That is, the profile measuring apparatus 100 can accurately measure the profile of the object 3.

Third Embodiment

Figure 12:
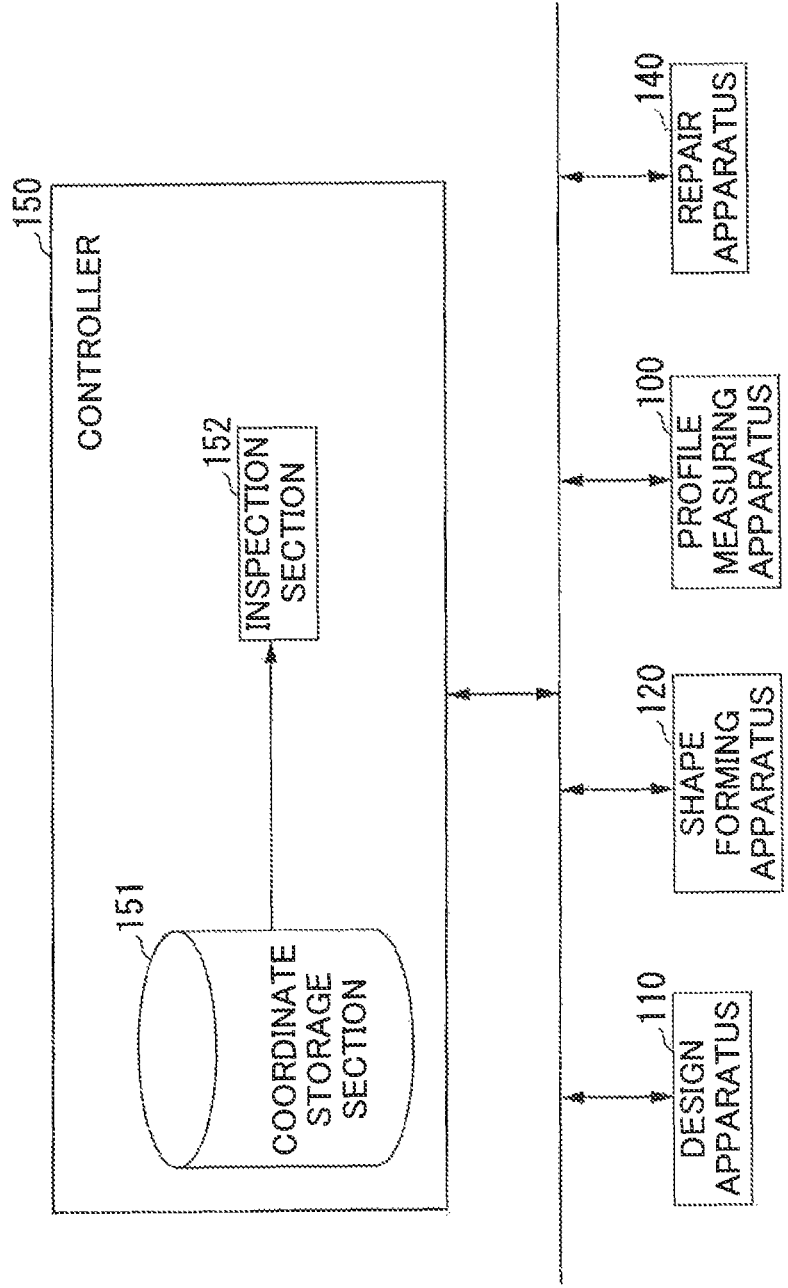
FIG. 12 is a configuration diagram showing a configuration of a structure manufacturing system according to the third embodiment of the present teaching.

Next, as the third embodiment in the present teaching, an explanation will made about a structure manufacturing system which includes any one of the profile measuring apparatus 100 of the first embodiment and the profile measuring apparatus 100 of the second embodiment. FIG. 12 is a block configuration diagram of a structure manufacturing system 200. The structure manufacturing system 200 includes a profile measuring apparatus 100 as described in any of the above embodiments, a design apparatus 110, a shape forming apparatus 120, a controller (inspection apparatus) 150, and a repair apparatus 140.

The design apparatus 110 creates design information with respect to the profile of the structure; and transmits the created design information to the shape forming apparatus 120. Further, the created design information is stored in a coordinate storage section 151, as will be described later, of the controller 150 by the design apparatus 100. Here, the design information is information indicating coordinates of each position of the structure. The shape forming apparatus 120 creates the structure based on the design information inputted from the design apparatus 110. The shape-forming of the shape forming apparatus 120 includes, for example, casting, forging, and cutting. The profile measuring apparatus 100 measures the coordinates of the created structure (object 3) to transmit information (profile information) indicating the measured coordinates to the controller 150.

The controller 150 includes the coordinate storage section 151 and an inspection section 152. As described above, the design information is stored in the coordinate storage section 151 by the design apparatus 110. The inspection section 152 reads the design information from the coordinate storage section 151. The inspection section 152 compares information (profile information) which indicates the coordinates received from the profile measuring apparatus 100 and the design information read from the coordinate storage section 151.

The inspection section 152 judges as to whether or not the structure is created in accordance with the design information based on the comparison result. In other words, the inspection section 152 judges as to whether or not the created structure is a nondefective structure. In a case that the structure is not created in accordance with the design information, the inspection section 152 judges as to whether or not the structure is repairable. In a case that the structure is repairable, the inspection section 152 calculates a defective portion and a repair amount based on the comparison result to transmit, to the repair apparatus 140, information indicating the defective portion and information indicating the repair amount.

The repair apparatus 140 processes the defective portion of the structure based on the information indicating the defective portion and the information indicating the repair amount received from the controller 150.

Figure 13:
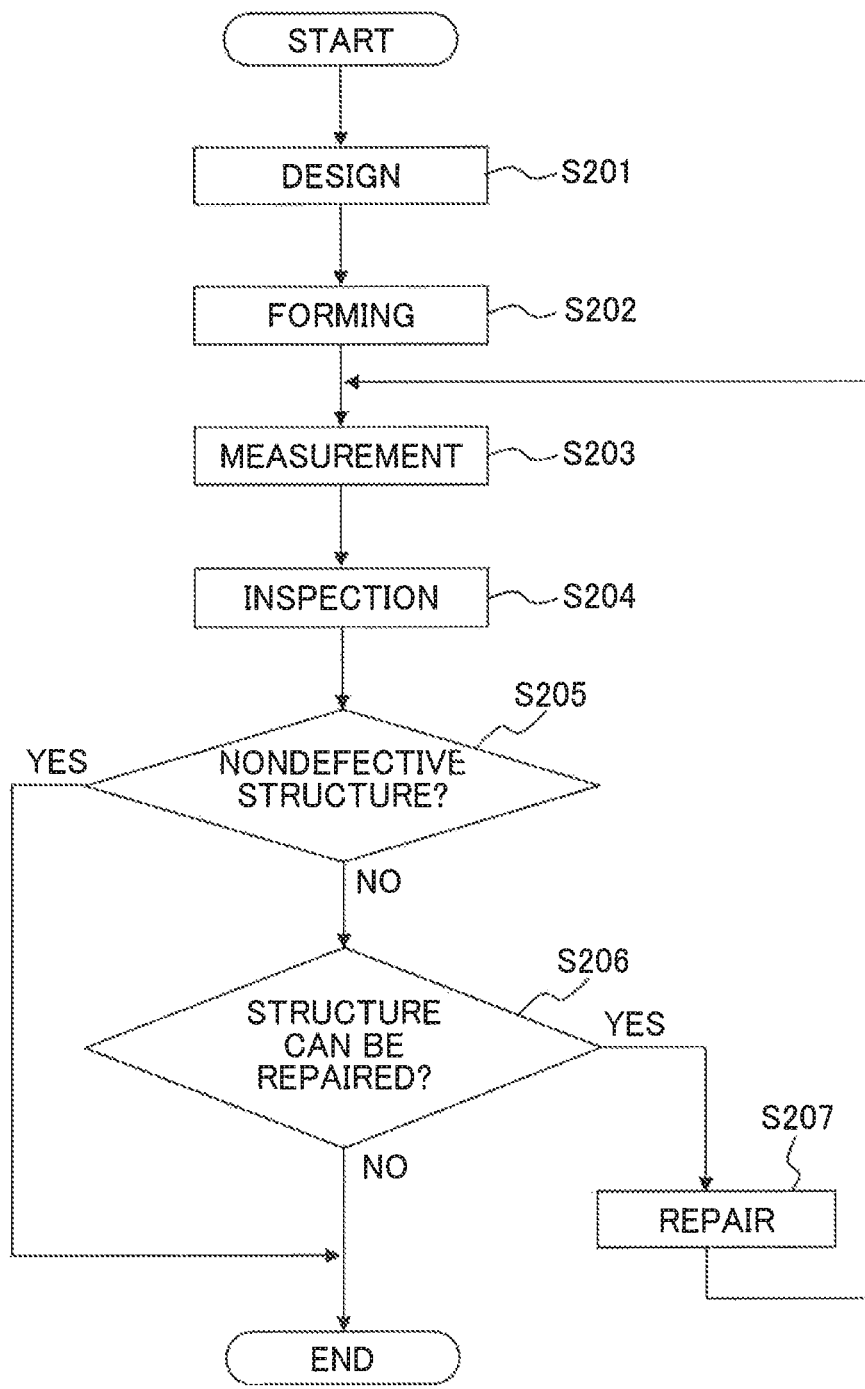
FIG. 13 is a flowchart showing an operation of the structure manufacturing system of the third embodiment.

FIG. 13 is a flowchart showing a processing flow of the structure manufacturing system 200. At first, the design apparatus 110 creates the design information with respect to the profile of the structure (step S201). Next, the shape forming apparatus 120 creates the structure based on the design information (step S202). Next, the profile measuring apparatus 100 measures the profile of the created structure (step S203). Next, the inspection section 152 of the controller 150 inspects as to whether or not the structure is created in accordance with the design information by comparing the profile information obtained from the profile measuring apparatus 100 with the design information (step S204).

Next, the inspection section 152 of the controller 150 judges as to whether or not the created structure is nondefective (step S205). In a case that the inspection section 152 judges that the created structure is nondefective (step S205; Yes), the structure manufacturing system 200 completes the process. In a case that the inspection section 152 judges that the created structure is defective (step S205: No), the inspection section 152 of the controller 150 judges as to whether or not the created structure is repairable (step S206).

In a case that the inspection section 152 judges that the created structure is repairable (step S206: Yes), the repair apparatus 140 executes reprocessing of the structure (step S207) and then the process is returned to the step S103. On the other hand, in a case that the inspection section 152 judges that the created structure is not repairable (step S206: No), the structure manufacturing system 200 completes the process. With that, the process of this flowchart is completed.

Accordingly, since the profile measuring apparatus 100 as described in any of the above embodiments can accurately measure the coordinates (three-dimensional profile) of the structure, the structure manufacturing system 200 is capable of judging as to whether or not the created structure is nondefective. In a case that the structure is defective, the structure manufacturing system 200 can execute the reprocessing of the structure to repair the structure.

Hereinabove, the explanations were made in detail with respect to the embodiments of the present teaching with reference to the drawings. However, the specific construction is not limited to those in these embodiments, but can possibly be changed as appropriate without departing from its spirit or scope.

The control sections provided for the control unit 40 and each of the devices in each of the embodiments (hereinafter, these are generally referred to as a controller CONT) or each of the sections provided for the controller CONT can be realized by dedicated hardware, or can be realized by a memory and a microprocessor.

The controller CONT or each of the sections provided for the controller CONT can be realized by the dedicated hardware. Further, functions of the controller CONT or each of the sections provided for the controller CONT can be realized as follows. That is, the controller CONT or each of the sections provided for the controller CONT is configured by the memory and a Central Processing Unit (CPU); and a program for realizing the functions of the controller CONT or each of the sections provided for the controller CONT is loaded into the memory and is executed.

The process executed on the controller CONT or each of the sections provided for the controller CONT can be performed as follows. That is, the program for realizing functions of the controller CONT or each of the sections provided for the controller CONT is stored in a non-transitory computer readable medium; the program stored in the non-transitory computer readable medium is read into a computer system and then is executed. The "computer system" referred to herein includes an operation system (OS) and/or hardware of a peripheral device and the like.

In a case that a WWW system is utilized, the "computer system" also includes a homepage viewable environment. The "non-transitory computer readable medium" refers to a portable medium such as a flexible disk, magneto optical disk, ROM, and CD-ROM; and a memory device such as a hard disk built in the computer system. Further, like a network (e.g., the Internet) and/or a communication wire used when the program is transmitted via a communication line (e.g., a telephone line), the "non-transitory computer readable medium" also includes a device for dynamically storing the program in a short period of time and/or a device for storing the program in a certain period of time, such as a volatile memory in the computer system which functions as a server or client when the program is stored dynamically in the short period of time. Further, the program can realize a part of the functions as described above; or the program can be realized in combination with another program, of which functions as described above are stored in the computer system in advance.

What is claimed is:

1. A profile measuring apparatus configured to measure a three-dimensional profile of an object having a plurality of convex portions and a plurality of concave portions, the apparatus comprising:
   a stage configured to receive the object thereon;
   a detector including:
      an irradiator configured to irradiate a linear-shaped measurement light onto an area on a surface of the object in a first direction; and
      an imager configured to obtain an image of the irradiated area by detecting a light reflected in a second direction from the irradiated area, the image being formed by the irradiation of the linear-shaped measurement light, and the second direction being different from the first direction, the first direction and the second direction having a non-parallel directional component;
   a relative-movement section configured to create relative rotational movement between the detector and the stage; and
   a controller configured to perform:
      by using a triangulation method, calculating three-dimensional position coordinates of the irradiated area, based on the obtained image; and wherein the irradiator is configured to irradiate the linear-shaped measurement light such that a longitudinal direction of a line shape of the linear-shaped measurement light intersects with both (a) a direction of the relative rotational movement that corresponds to a circumferential direction associated with a rotational axis of the relative rotational movement and (b) at least one of a ridge-line direction of a convex portion in the irradiated area and an extending direction of a concave portion in the irradiated area.

2. The profile measuring apparatus according to claim 1, wherein
the relative-movement section is further configured to create relative translational movement between the detector and the object.

3. The profile measuring apparatus according to claim 1, wherein
the relative-movement section moves the irradiator to a position such that the first direction from which the linear-shaped measurement light is irradiated by the irradiator corresponds to a normal direction that is perpendicular to an envelope plane of a top of a tooth in the irradiated area.

4. The profile measuring apparatus according to claim 1, wherein
the relative-movement section includes a rotational-movement section configured to rotate the stage along a circumferential direction of the object;
the controller controls the imager to take a plurality of images of the irradiated area when the rotational-movement section rotates the stage; and
the controller calculates positions of a plurality of concave-convex shapes based on the images.

5. The profile measuring apparatus according to claim 4, further comprising:
a holder configured to hold the irradiator and the imager, wherein the relative-movement section moves the holder relative to the stage.

6. The profile measuring apparatus according to claim 5, wherein
the relative-movement section displaces the irradiated area in a direction intersecting with a rotational direction of the stage, under a condition that the relative-movement section rotates the stage in the rotational direction, wherein the rotational direction corresponds to a circumferential direction associated with a rotational axis of the stage.

7. The profile measuring apparatus according to claim 1, wherein the controller is further configured to control a velocity of the rotational movement between the detector and the stage, based on a position of the irradiated area in a radial direction of the object.

8. The profile measuring apparatus according to claim 1, wherein the controller is further configured to change an imaging interval of the imager based on a position of the irradiated area in the radial direction of the object.

9. The profile measuring apparatus according to claim 1, wherein
the relative-movement section rotates the object so that a central axis of the object coincides with a rotational axis of the rotational movement.

10. The profile measuring apparatus according to claim 5, further comprising:
a memory configured to store information associated with an extending direction of the convex-concave shapes; and a position-detector configured to detect a position of the imager;
wherein the controller is configured to:
obtain, from the position-detector, the position of the imager;
obtain the information from the storage section; and
control the relative-movement section to create a translational movement along the extending direction according to the information.

11. The profile measuring apparatus according to claim 1, wherein
the irradiator includes an irradiation light system configured to generate the linear-shaped measurement light and distribute the linear-shaped measurement light in a line when the linear-shaped measurement light is irradiated onto a plane.

12. The profile measuring apparatus according to claim 11, wherein
the irradiator irradiates the linear-shaped measurement light so that the line intersects with the circumferential direction of the object.

13. A structure manufacturing system comprising:
a design apparatus configured to create a design information with respect to a profile of a structure;
a shape forming apparatus which creates the structure based on the design information;
the profile measuring apparatus as defined in claim 1 which is configured to measure, based on an image obtained by taking the image of the structure, the profile of the structure created by the shape forming apparatus; and
an inspection apparatus configured to compare a profile information obtained by the measurement with the design information.

14. A method for measuring a three-dimensional profile of an object having a plurality of convex portions and a plurality of concave portions, the method being performed by a profile measuring apparatus,
the apparatus including:
a stage configured to receive the object thereon;
a detector including:
an irradiator configured to irradiate a linear-shaped measurement light onto an area on a surface of the object in a first direction; and
an imager configured to obtain an image of the irradiated area by detecting a light reflected in a second direction from the irradiated area, the image being formed by the irradiation of the linear-shaped measurement light, and the second direction being different from the first direction, the first direction and the second direction having a non-parallel directional component;
a relative-movement section configured to create relative rotational movement between the detector and the stage; and
a controller configured to calculate the profile of the object, based on the obtained image,
the method comprising:
by using a triangulation method, calculating three-dimensional position coordinates of the irradiated area, based on the obtained image; and
irradiating the linear-shaped measurement light such that a longitudinal direction of a line shape of the linear-shaped measurement light intersects with both (a) a direction of the relative rotational movement that corresponds to a circumferential direction associated with a rotational axis of the relative rotational movement and (b) at least one of a ridge-line direction of a convex portion in the irradiated area and an extending direction of a concave portion in the irradiated area.

15. A method for manufacturing a structure, comprising:
creating a design information with respect to a profile of the structure;
creating the structure based on the design information;
measuring the profile of the created structure, based on an image generated by taking the image of the created structure, by using the method for measuring the profile of the object as defined in claim 14; and
comparing a profile information obtained by the measurement with the design information.

16. The method for manufacturing the structure according to claim 15, further comprising
executing a reprocessing of the structure based on a result of the comparison.

17. The method for manufacturing the structure according to claim 16, further comprising
re-executing the creation of the structure.

18. A non-transitory computer readable medium storing a program which allows a computer to execute a method for measuring a three-dimensional profile of an object having a plurality of convex portions and a plurality of concave portions, the computer as a profile measuring apparatus including:
a stage configured to receive the object thereon;
a detector including:
an irradiator configured to irradiate a linear-shaped measurement light onto an area on a surface of the object in a first direction; and
an imager configured to obtain an image of the irradiated area by detecting a light reflected in a second direction from the irradiated area, the image being formed by the irradiation of the linear-shaped measurement light, and the second direction being different from the first direction, the first direction and the second direction having a non-parallel directional component;
a relative-movement section configured to create relative rotational movement between the detector and the stage; and
a controller configured to calculate the profile of the object based on the obtained image, the method comprising:
by using a triangulation method, calculating three-dimensional position coordinates of the irradiated area, based on the obtained image; and
irradiating the linear-shaped measurement light such that a longitudinal direction of a line shape of the linear-shaped measurement light intersects with both (a) a direction of the relative rotational movement that corresponds to a circumferential direction associated with a rotational axis of the relative rotational movement and (b) at least one of a ridge-line direction of a convex portion in the irradiated area and an extending direction of a concave portion in the irradiated area.

19. The profile measuring apparatus according to claim 1, wherein
the object has a concave-convex shape which is formed repeatedly in a circumferential direction of the object, and
the circumferential direction of the object is the direction of the relative rotational movement.

20. The profile measuring apparatus according to claim 1, wherein
the object includes one of a gear or a turbine blade, and
a rotational axis of the relative rotational movement substantially coincides with a rotational axis of the object.

21. The profile measuring apparatus according to claim 20, wherein
the relative-movement section is configured to create relative translational movement between the detector and the object, and
relative tilting between the detector and the stage around an axis intersecting with the rotational axis of the relative rotational movement.

22. The profile measuring apparatus according to claim 1, wherein
the relative-movement section includes a rotational-movement section configured to rotate the detector to change the longitudinal direction of the line shape of the linear-shaped measurement light, and
the controller is configured to control the rotational-movement section such that the longitudinal direction of the line shape of the linear-shaped measurement light intersects with both (a) the direction of the relative rotational movement that corresponds to a circumferential direction associated with a rotational axis of the relative rotational movement and (b) at least one of the ridge-line direction of the convex portion in the irradiated area and the extending direction of the concave portion in the irradiated area.

23. The method for measuring the three-dimensional profile of the object according to claim 14, wherein
the object has a concave-convex shape which is formed repeatedly in a circumferential direction of the object, and
the circumferential direction of the object is the direction of the relative rotational movement.

24. The method for measuring the three-dimensional profile of the object according to claim 14, wherein
the object includes one of a gear or a turbine blade, and
a rotational axis of the relative rotational movement substantially coincides with a rotational axis of the object.

25. The method for measuring the three-dimensional profile of the object according to claim 24, wherein
the relative-movement section is configured to create relative translational movement between the detector and the object, and
relative tilting between the detector and the stage around an axis intersecting with the rotational axis of the relative rotational movement.

26. The method for measuring the three-dimensional profile of the object according to claim 14, wherein
the relative-movement section includes a rotational-movement section configured to rotate the detector to change the longitudinal direction of the line shape of the linear-shaped measurement light, and
the method further comprises:
controlling the rotational movement section such that the longitudinal direction of the line shape of the linear-shaped measurement light intersects with both (a) the direction of the relative rotational movement that corresponds to a circumferential direction associated with a rotational axis of the relative rotational movement and (b) at least one of the ridge-line direction of the convex portion in the irradiated area and the extending direction of the concave portion in the irradiated area.

27. The non-transitory computer readable medium storing the program according to claim 18, wherein
the object has a concave-convex shape which is formed repeatedly in a circumferential direction of the object, and
the circumferential direction of the object is the direction of the relative rotational movement.

28. The non-transitory computer readable medium storing the program according to claim 18, wherein
the object includes one of a gear or a turbine blade, and
a rotational axis of the relative rotational movement substantially coincides with a rotational axis of the object.

29. The non-transitory computer readable medium storing the program according to claim 28, wherein
the relative-movement section is configured to create relative translational movement between the detector and the object, and
relative tilting between the detector and the stage around an axis intersecting with the rotational axis of the relative rotational movement.

30. The non-transitory computer readable medium storing the program according to claim 18, wherein
the relative-movement section includes a rotational-movement section configured to rotate the detector to change the longitudinal direction of the line shape of the linear-shaped measurement light, and
the method further comprises:
controlling the rotational movement section such that the longitudinal direction of the line shape of the linear-shaped measurement light intersects with both (a) the direction of the relative rotational movement that corresponds to a circumferential direction associated with a rotational axis of the relative rotational movement and (b) at least one of the ridge-line direction of the convex portion in the irradiated area and the extending direction of the concave portion in the irradiated area.

31. A profile measuring apparatus configured to measure a three-dimensional profile of an object mounted on a stage, the object having a plurality of convex portions and a plurality of concave portions, the apparatus comprising:
a detector configured to be attached to a relative-movement section, including:
an irradiator configured to irradiate a linear-shaped measurement light onto an area on a surface of the object in a first direction; and
an imager configured to obtain an image of the irradiated area by detecting a light reflected in a second direction from the irradiated area, the image being formed by the irradiation of the linear-shaped measurement light, and the second direction being different from the first direction, the first direction and the second direction having a non-parallel directional component;
wherein the relative-movement section is configured to create relative rotational movement between the detector and the stage, and
wherein the irradiator is configured to irradiate the linear-shaped measurement light such that a longitudinal direction of a line shape of the linear-shaped measurement light intersects with both (a) a direction of the relative rotational movement that corresponds to a circumferential direction associated with a rotational axis of the relative rotational movement and (b) at least one of a ridge-line direction of a convex portion in the irradiated area and an extending direction of a concave portion in the irradiated area.

32. The profile measuring apparatus according to claim 31, wherein the irradiator and the imager are controlled by a controller, and
wherein, by using a triangular method, the controller is configured to perform calculating three-dimensional position coordinates of the irradiated area, based on the obtained image.

33. The profile measuring apparatus according to claim 31, wherein
the relative-movement section is further configured to create relative translational movement between the detector and the object.

34. The profile measuring apparatus according to claim 31, wherein
the relative-movement section moves the irradiator to a position such that the first direction from which the linear-shaped measurement light is irradiated by the irradiator is determined based on a normal direction that is perpendicular to an envelope plane of a top of a tooth in the irradiated area.

35. The profile measuring apparatus according to claim 32, wherein
the relative-movement section includes a rotational-movement section configured to rotate the stage along a circumferential direction of the object,
the controller controls the imager to take a plurality of images of the irradiated area when the relative-movement section rotates the stage, and
the controller calculates positions of a plurality of concave-convex shapes based on the images.

36. The profile measuring apparatus according to claim 31, further comprising:
a holder configured to hold the irradiator and the imager, wherein the relative-movement section moves the holder relative to the stage.

37. The profile measuring apparatus according to claim 31, wherein
the relative-movement section displaces the irradiated area in a direction intersecting with a rotational direction of the stage, under a condition that the relative-movement section rotates the stage in the rotational direction, wherein the rotational direction is parallel to a circumferential direction associated with a rotational axis of the stage.

38. The profile measuring apparatus according to claim 32, wherein the controller is further configured to control a velocity of the rotational movement between the detector and the stage, based on a position of the irradiated area in a radial direction of the object.

39. The profile measuring apparatus according to claim 32, wherein the controller is further configured to change an imaging interval of the imager based on a position of the irradiated area in the radial direction of the object.

40. The profile measuring apparatus according to claim 31, wherein
the relative-movement section rotates the object so that a central axis of the object coincides with a rotational axis of the rotational movement.

41. The profile measuring apparatus according to claim 32, further comprising:
a memory configured to store information associated with an extending direction of the convex-concave shapes; and a position-detector configured to detect a position of the imager;

wherein the controller is configured to:
obtain, from the position-detector, the position of the imager;
obtain the information from the storage section; and
control the relative-movement section to create a translational movement along the extending direction according to the information.

42. The profile measuring apparatus according to claim 31, wherein
the irradiator includes an irradiation light system configured to generate the linear-shaped measurement light and distribute the linear-shaped measurement light in a line when the linear-shaped measurement light is irradiated onto a plane.

43. The profile measuring apparatus according to claim 31, wherein
the irradiator irradiates the linear-shaped measurement light so that the line intersects with the circumferential direction of the object.

* * * * *